(12) United States Patent
Anderson et al.

(10) Patent No.: US 7,145,487 B1
(45) Date of Patent: Dec. 5, 2006

(54) SIGNAL PROCESSING PROVIDING LOWER DOWNSAMPLING LOSSES

(75) Inventors: Erik Anderson, San Francisco, CA (US); Paul Eric Beckmann, Sunnyvale, CA (US); William Kerry Keal, Santa Clara, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 11/064,763

(22) Filed: Feb. 23, 2005

Related U.S. Application Data

(60) Provisional application No. 60/547,394, filed on Feb. 23, 2004.

(51) Int. Cl.
*H03M 7/00* (2006.01)
(52) U.S. Cl. ........................ 341/106; 375/219
(58) Field of Classification Search ................ 341/106; 375/219, 316, 150
See application file for complete search history.

(56) References Cited

U.S. PATENT DOCUMENTS

| | | | |
|---|---|---|---|
| 5,126,960 A * | 6/1992 | Thong | ........................ 708/276 |
| 5,982,811 A | 11/1999 | Harrison et al. | |
| 6,014,682 A | 1/2000 | Stephen et al. | |
| 6,137,828 A * | 10/2000 | Epstein et al. | ............... 375/219 |
| 6,452,982 B1 | 9/2002 | O'Dell et al. | |
| 6,583,758 B1 | 6/2003 | King | |
| 6,606,346 B1 | 8/2003 | Abraham et al. | |
| 6,704,348 B1 | 3/2004 | Abraham et al. | |
| 2002/0012387 A1* | 1/2002 | Shakeri et al. | |
| 2002/0025006 A1* | 2/2002 | Mehrnia et al. | |

* cited by examiner

*Primary Examiner*—Jean Bruner Jeanglaude
(74) *Attorney, Agent, or Firm*—MacPherson Kwok Chen & Held LLP

(57) ABSTRACT

Methods and devices for processing GPS signals are provided. The device includes: a memory for storing one or more lookup tables, each lookup table including a plurality of entries, each entry including an input segment and an output segment, wherein the output segment is a system response to the corresponding input segment. The device further includes a processor configured to receive an input data sequence including one or more input segments, and for each of the input segments, retrieve from one of the lookup tables the output segments corresponding to the input segment. The processor is further configured to perform a time-shifted sum of one or more output segments to produce an output sequence that is a downsampled representation of the input data sequence.

42 Claims, 22 Drawing Sheets

-8.184 MHz   8.184 MHz

-8.192 MHz   8.192 MHz

| Sub Block # | | | | | | | | | | | | |
|---|---|---|---|---|---|---|---|---|---|---|---|---|
| 0 | 0 | 1 | 2 | ... | 510 | 511 | 511 | 512 | 513 | ... | 1,020 | 1,021 | 1,022 |
| 1 | 1,023 | 1,024 | 1,025 | ... | 1,533 | 1,534 | 1,534 | 1,535 | 1,536 | ... | 2,043 | 2,044 | 2,045 |
| 2 | 2,046 | 2,047 | 2,048 | ... | 2,556 | 2,557 | 2,557 | 2,558 | 2,559 | ... | 3,066 | 3,067 | 3,068 |
| 3 | 3,069 | 3,070 | 3,071 | ... | 3,579 | 3,580 | 3,580 | 3,581 | 3,582 | ... | 4,089 | 4,090 | 4,091 |
| 4 | 4,092 | 4,093 | 4,094 | ... | 4,602 | 4,603 | 4,603 | 4,604 | 4,605 | ... | 5,112 | 5,113 | 5,114 |
| 5 | 5,115 | 5,116 | 5,117 | ... | 5,625 | 5,626 | 5,626 | 5,627 | 5,628 | ... | 6,135 | 6,136 | 6,137 |
| 6 | 6,138 | 6,139 | 6,140 | ... | 6,648 | 6,649 | 6,649 | 6,650 | 6,651 | ... | 7,158 | 7,159 | 7,160 |
| 7 | 7,161 | 7,162 | 7,163 | ... | 7,671 | 7,672 | 7,672 | 7,673 | 7,674 | ... | 8,181 | 8,182 | 8,183 |
| 8 | 8,184 | 8,185 | 8,186 | ... | 8,694 | 8,695 | 8,695 | 8,696 | 8,697 | ... | 9,204 | 9,205 | 9,206 |
| 9 | 9,207 | 9,208 | 9,209 | ... | 9,717 | 9,718 | 9,718 | 9,719 | 9,720 | ... | 10,227 | 10,228 | 10,229 |
| 10 | 10,230 | 10,231 | 10,232 | ... | 10,740 | 10,741 | 10,741 | 10,742 | 10,743 | ... | 11,250 | 11,251 | 11,252 |
| 11 | 11,253 | 11,254 | 11,255 | ... | 11,763 | 11,764 | 11,764 | 11,765 | 11,766 | ... | 12,273 | 12,274 | 12,275 |
| 12 | 12,276 | 12,277 | 12,278 | ... | 12,786 | 12,787 | 12,787 | 12,788 | 12,789 | ... | 13,296 | 13,297 | 13,298 |
| 13 | 13,299 | 13,300 | 13,301 | ... | 13,809 | 13,810 | 13,810 | 13,811 | 13,812 | ... | 14,319 | 14,320 | 14,321 |
| 14 | 14,322 | 14,323 | 14,324 | ... | 14,832 | 14,833 | 14,833 | 14,834 | 14,835 | ... | 15,342 | 15,343 | 15,344 |
| 15 | 15,345 | 15,346 | 15,347 | ... | 15,855 | 15,856 | 15,856 | 15,857 | 15,858 | ... | 16,365 | 16,366 | 16,367 |

FIG. 7

$f = -512 kHz$
$\omega = -\pi$

SIGNAL PROCESSING PROVIDING LOWER DOWNSAMPLING LOSSES

CROSS-REFERENCE TO RELATED APPLICATIONS

This application claims the benefit of U.S. Provisional Application No. 60/547,394, filed on Feb. 23, 2004, entitled "Signal Processing Providing Lower Downsampling Losses," the disclosure of which is incorporated by reference herein in its entirety.

FIELD OF THE INVENTION

The disclosed embodiments relate to signal processing and signal processing systems.

BACKGROUND OF THE INVENTION

Signal receivers often filter and down-sample high-speed data streams from radio frequency (RF) front-ends to a lower data rate for processing that includes correlation and detection. Due to cost, complexity, and resource constraints, conventional receivers perform this function in a manner that is far from optimal, often using simple summation and averaging as an anti-aliasing filter prior to sample rate compression. Although this approach is relatively easy to implement, it results in a significant reduction in signal-to-noise ratio (SNR) (approximately 0.6 dB reduction) relative to an ideal filter. An alternative is to use a more sophisticated filter at the input sample rate to achieve lower loss. Unfortunately, the use of a high data rate filter requires a considerable amount of processing power and time.

Accordingly, it may be desirable to provide a system to efficiently downsample a signal while also providing greater sensitivity.

SUMMARY OF THE INVENTION

In accordance with the present invention, an efficient polyphase filter function is provided using lookup tables. Embodiments of the present invention are particularly suitable for the processing of global positioning system ("GPS") signals, which typically uses 2-bit data samples. In accordance with certain embodiments for GPS systems, the high data rate 16-bit complex math utilized in a conventional polyphase filter implementation can be replaced with a simple 1 or 2-bit table lookup.

In accordance with embodiments of the present invention, a device for processing signals is provided. The device includes: a memory for storing one or more lookup tables, each lookup table including a plurality of entries, each entry including an input segment and an output segment, wherein the output segment is a system response to the corresponding input segment. The device further includes a processor configured to receive an input data sequence including one or more input segments, and for each of the input segments, retrieve from one of the lookup tables the output segments corresponding to the input segment. The processor is further configured to perform a time-shifted sum of one or more output segments to produce an output sequence that is a downsampled representation of the input data sequence.

In accordance with embodiments of the present invention, a method of processing a signal is provided, comprising: storing one or more lookup tables, each lookup table comprising a plurality of entries, each entry comprising an input segment and an output segment, wherein the output segment is a system response to the corresponding input segment; receiving an input data sequence comprising one or more input segments; for each of the input segments, retrieving from one of the lookup tables the output segments corresponding to the input segment; and summing one or more time-shifted output segments to produce an output sequence that is a downsampled representation of the input data sequence.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE DRAWINGS

FIG. 7 shows a sample duplication and insertion in accordance with embodiments of the present invention.

DETAILED DESCRIPTION

Figure 1:
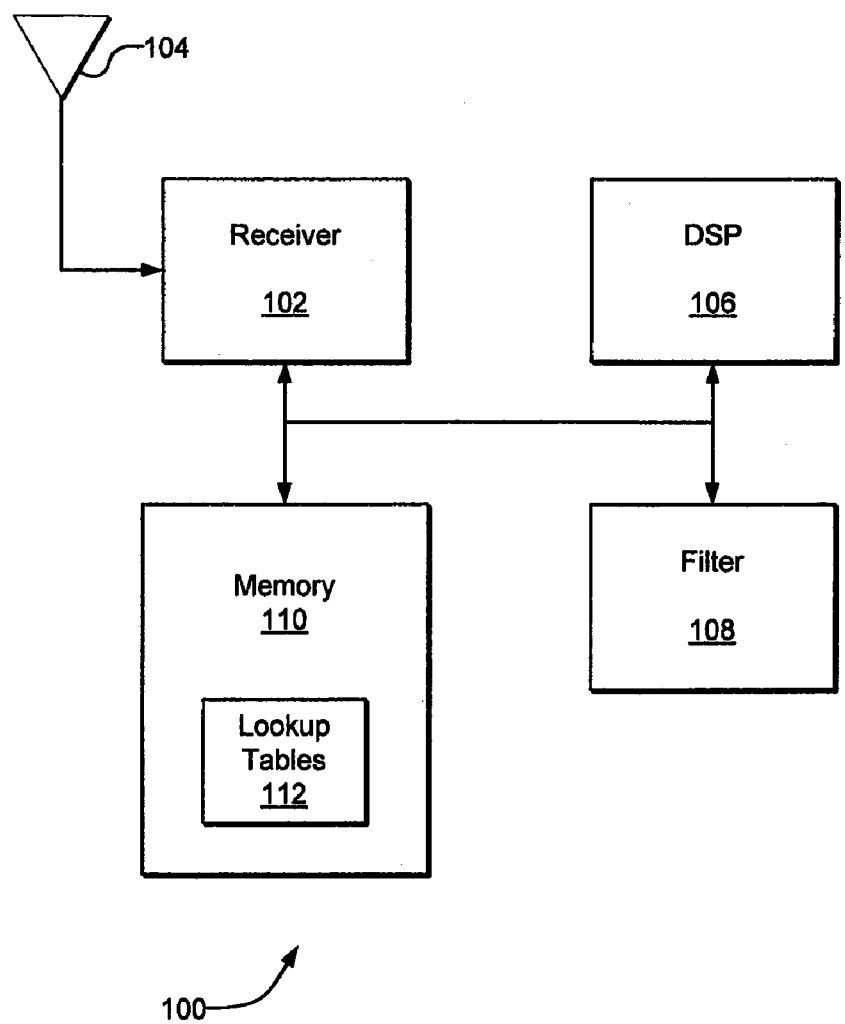
FIG. 1 is a block diagram of a reduced computation polyphase downsampling system, under an embodiment.

In the following description, reference is made to the accompanying drawings which illustrate several embodiments of the present invention. It is understood that other embodiments may be utilized and changes may be made without departing from the spirit and scope of the present disclosure. The following detailed description is not to be taken in a limiting sense, and the scope of the embodiments of the present invention is defined only by the claims of the issued patent. Numerous specific details are introduced to provide a thorough understanding of, and enabling description for, embodiments of the systems and methods for signal processing. One skilled in the relevant art, however, will recognize that the systems and methods described herein can be practiced without one or more of the specific details, or with other components, systems, and the like. In other instances, well-known structures or operations are not shown, or are not described in detail, to avoid obscuring aspects of the systems and methods for signal processing.

Systems and methods are provided herein that apply polyphase filter techniques to a signal downsampler with a resulting improvement in sensitivity. The signals of various embodiments include GPS signals, but are not so limited. The polyphase filter techniques described herein, referred to as Reduced Computation Polyphase Downsampling (RCPD) use the set of input data values provided by a GPS RF device in order to filter the received signals at a lower computational cost than typical polyphase phase filtering techniques. Consequently, the systems and methods described herein filter and process intermediate frequency (IF) signals or data streams with minimal computational effort to achieve lower downsampling losses than typical signal processing systems and methods.

Polyphase downsampling is a method of improving computational speed relative to a conventional filter and sample rate compressor system. Polyphase downsampling reduces the number of computations required by an integer factor (such as, e.g., six (6), eight (8), twelve (12), or sixteen (16), referred to as the downsampling rate or sampling rate compression ratio D) relative to conventional filtering. When the downsampler is implemented on a microprocessor, a digital signal processor (DSP), or in hardware, the availability of polyphase filters can render a higher quality downsampler that is practical for use in situations and systems where it is not practical to use the equivalent high-data rate filter followed by a sample rate compressor. In accordance with embodiments of the present invention, a method is provided which more efficient than a polyphase implementation, but is numerically equivalent to a generalized polyphase downsampler as long as the input values are restricted to those of the table. The method can yield performance improvements of 0.5 dB when compared with a conventional GPS downsampler.

A GPS receiver that uses a single-instruction multiple-data (SIMD) engine, for example, is a system powerful enough to make practical use of polyphase downsampling, thereby reducing downsampling losses, while incurring only a fraction of the computational cost of a conventional finite impulse response (FIR) filter followed by sample rate compressor.

The RCPD of an embodiment extends polyphase downsampling to signals like GPS signals by taking advantage of the fact that GPS signals at IF are represented by a small number of bits. The number of bits representing the GPS IF signals is typically at least one of one (1) bit, two (2) bits, and four (4) bits, but is not so limited.

FIG. 1 is a block diagram of a reduced computation polyphase downsampling system 100, under an embodiment. The system 100 includes at least one receiver 102 coupled among at least one of an antenna 104, a processor 106, a filter 108, and a memory area 110 or device, but is not so limited. The filter 108 of an embodiment includes a Finite Impulse Response (FIR) filter, but is not so limited. The filter 108 generates data of a pre-specified number of data tables 112, also referred to as lookup tables 112, where the data lookup tables 112 are stored in the memory area 110, as described below. The system 100 of an embodiment includes four data tables 112, but alternative embodiments can use other numbers/combinations of data tables, as will be described in greater detail below. The tables will typically be precomputed but the table generation from an FIR filter is included for completeness.

An embodiment of the RCPD generalizes the FIR filter along with use of at least one table lookup to achieve the computational results of a polyphase downsampler when the input data sequence is, in an embodiment, a number of bits representing a signal. The filter of an embodiment is a 48-tap complex FIR filter that includes a windowed Hilbert transform cascaded with band-pass filtering. The FIR filter calculates the entries of the tables. A 48-tap filter is used because the value 48 is a multiple of the sample rate compressor value (D). If we divide the system response of the filter (where system response is the output segment resulting from a particular input segment, for example a 16 sample input segment) into D phases, where D is sixteen (16) for example, fifteen (15) of the phases will have a system response of length four and the last phase will have a system response of length three. Only a single phase is used to calculate the output so the phase having the system response of length three is selected for use in calculating the single phase for the output, thereby further reducing computations, but the embodiment is not so limited. Use of the 48-tap filter can result in performance 0.5 dB better than traditional averaging and 0.1 dB worse than the ideal case.

Figure 2:
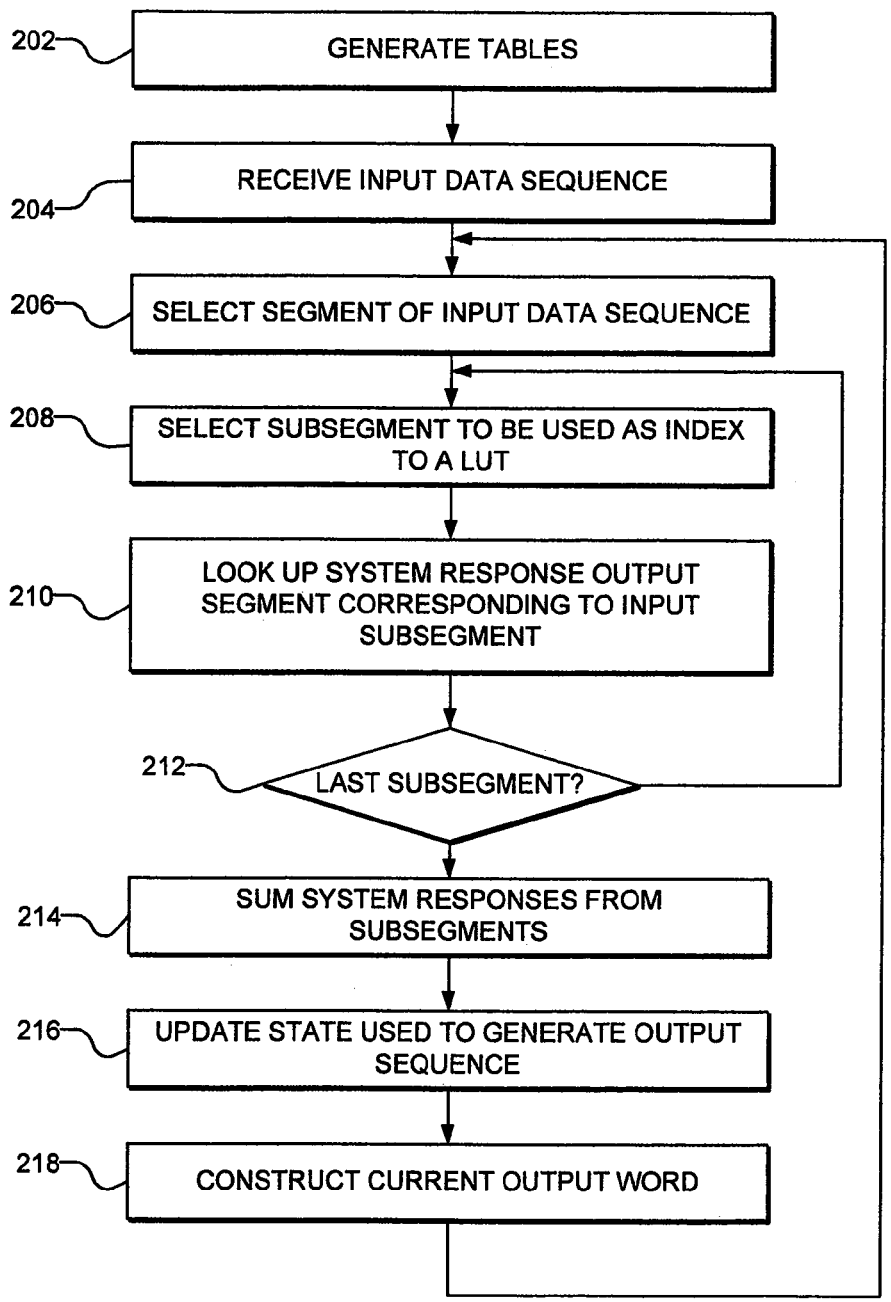
FIG. 2 is a flow diagram for performing reduced computation polyphase downsampling, under an embodiment.

FIG. 2 is a flow diagram 200 of an embodiment for performing reduced computation polyphase downsampling. The RCPD is performed by, for example, the RCPD system 100 described above with reference to FIG. 1, or by a system hosting and/or coupled to components of the RCPD system 100. Operation begins by generating the table entries for the lookup tables, at block 202. The system receives an input data sequence, at block 204. Each segment of the input data sequence of an embodiment includes 32 data bits (16 samples, where each sample is represented by two data bits). A segment of the data sequence is selected, at block 206. The segment is further divided into one or more subsegments 208 to be used as indices to lookup tables. Each subsegment corresponds to a particular lookup table. The selected subsegment includes a pre-specified number of bits which, in an embodiment, is eight bits.

Components of the system perform a table lookup of the impulse response that corresponds to the selected subsegment, at block 210. The table lookup is performed using the tables in memory described above. In response to the table lookup, the system provides an output segment from the lookup tables that corresponds to the system response, at block 210. The system determines if any subsegments of the current input data segment remain to be processed, at block 212. When additional subsegments of the current input data segment remain for processing, operation returns to select another subsegment of the current input segment for processing, at block 208, and continues as described above. When all subsegments of a the current input segment have been processed, the subsegment system responses are summed at block 214, the internal state is updated with the newly generated summed system response at block 216, and the current output sample is constructed from the system state at block 216.

Operation subsequently returns to receive another input data segment, at block 204, and operation continues as described above.

A single large table implementation would include 232 values. Using this impractically large table, an output can be computed for every combination of 16 input samples (2 bits per sample) with the sequence of three complex outputs being stored at each table index. In contrast, an embodiment of the RCPD provides the numerical equivalent to this single large table by generating four separate tables, each having 28 or 256 entries. Each table corresponds to one 8-bit segment of the 32-bit input data segment, and each entry of each table corresponds to the output achieved by permuting the eight bits while setting the remaining 24-bit values of the 32-bit input data segment to zero. Term-by-term summing of the values in the four tables produces the same outputs as the outputs of the 32-bit table, but in a realizable form that provides an appropriate balance between memory usage and processor cycle count. Therefore, use of the RCPD is computationally more efficient than the conventional polyphase filter implementation and provides more practical resource usage in a host device when performing downsampling on a microprocessor because table-lookup operations are relatively cheap when compared with the performance of a large number of multiply operations.

In addition to performing a bandpass filter with downsampling using the Hilbert Transform, equivalent output can be achieved by frequency shifting the time data by the intermediate frequency and then low pass filtering with a polyphase filter. The same novel approach of using table lookups for the large number of multiplication steps can be used. If the intermediate frequency is ¼ of the sample rate, then the frequency shifting can be performed by multiplying by the repeated sequence [+1, −j, −1, +j] in a preferred embodiment, or [+1, +j, −1, −j]. The frequency shifting sequence can be done in hardware or software.

Depending on the RF processing chip, it may be desirable to downsample by a non integer amount. In these cases, samples can be inserted or removed. Samples could be inserted or deleted after the frequency shifting in the preferred embodiment or before the frequency shifting, but before the filtering in both cases.

Exemplary embodiments of the present invention are described in greater detail below.

RF Front End

Figure 3:
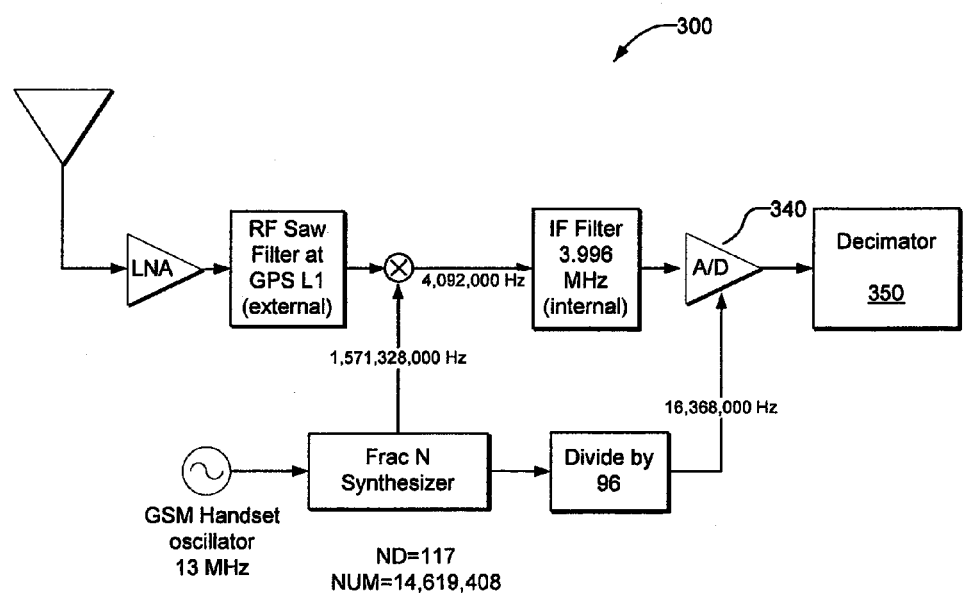
FIG. 3 shows an exemplary RF front end that may be used in accordance with embodiments of the present invention.

FIG. 3 shows an exemplary RF front end 300 that may be used in accordance with embodiments of the present invention. The RF front end 300 has a fixed relationship between the output sample rate and the IF mixing frequency. The IF mixing frequency is 96 times the output sample rate. The output sample rate will be set to 16.368 MHz. Accordingly, the IF downmix frequency will be 1571.328 MHz. After downmixing, the GPS signal band will be centered at 4.092 MHz. Table 1 shows the frequency relationships of various components of the RF front end 300.

TABLE 1

| | |
|---|---|
| GPS L1 frequency | 1,575,420,000.00 Hz |
| Desired sample rate | 16,368,000.00 Hz |
| Desired LO freq | 1,571,328,000.00 Hz |
| Theoretical IF Frequency | 4,092,000.00 Hz |
| Clock used for sampling | 16,368,000.00 Hz |
| Oscillator | 13,000,000.00 Hz |
| Actual LO freq | 1,571,328,000.07 Hz |
| Frequency error | −0.07 Hz |
| Actual IF freq | 4,091,999.93 |
| Actual sample rate | 16,368,000.0007 Hz |

Sign-Magnitude Representation

The data is received by the DSP via two multichannel buffered serial ports ("McBSP"). A first McBSP receives sign bits while the other McBSP receives magnitude bits. The received data is packed into 16-bit words and stored into internal memory using DMA. The DMA controller is configured to generate an interrupt every one millisecond. At this point, there will be two buffers each containing 16,368 bits 1,023 words of data. Thus, the downsampler should be designed to work on one millisecond sample blocks.

The 2-bit data received from the RF front end is encoded using an offset representation, not standard two's complement arithmetic. The mapping from input bits to represented values is shown below:

| Sign | Magnitude | Value |
|---|---|---|
| 0 | 0 | +¼ |
| 0 | 1 | +¾ |
| 1 | 0 | −¼ |
| 1 | 1 | −¾ |

A different data representation is used internally to store quantized data (the output of the downsampler and the grid). This format has an additive relationship between the 2-bit data. This format is sometimes referred to as either 2-bit Offset format or Sign-XOR-Magnitude format throughout this document. The mapping from bits to represented values for the quantized data is shown below:

| Sign | Sign-XOR-Magnitude | Value |
|---|---|---|
| 0 | 0 | +¼ |
| 0 | 1 | +¾ |
| 1 | 0 | −¾ |
| 1 | 1 | −¼ |

A linear relationship between the sign and sign-XOR-magnitude bits (sign "exclusive or" magnitude) exists. The following values can be assigned to each bit

| | | |
|---|---|---|
| Sign | 0 | = +½ |
| | 1 | = -½ |
| Sign-XOR-Magnitude | 0 | = -¼ |
| | 1 | = +¼ |

Using this table, the bit representation can be mapped to the actual values. For example, {Sign=0, Sign-XOR-Magnitude=1}=(+½)+(+¼)=+¾; (Sign=1, Sign-XOR-Magnitude=1)=(-½)+(+¼)=-¼; etc. The value of the sign-XOR-magnitude bits differ by a factor of -0.5 from the sign bits. This relationship can be used to reduce the number of lookup tables utilized by the downsampler.

Conversion between the offset representation and two's complement can also be performed in a straightforward manner. The sign bit is stored in the most significant bit ("MSB") of a 16-bit word (MSB=bit 15), the sign-XOR-magnitude bit is stored in bit 14, and a 1 is stored in bit 13. This yields the following representation:

| Sign | Sign-XOR-Magnitude | Binary | Two's Complement Value |
|---|---|---|---|
| 0 | 0 | 0010000000000000 | +¼ |
| 0 | 1 | 0110000000000000 | +¾ |
| 1 | 0 | 1010000000000000 | -¾ |
| 1 | 1 | 1110000000000000 | -¼ |

The sign-magnitude representation is converted to the 2-bit offset representation immediately after the RF data is received. This conversion can be accomplished by performing an exclusive-or ("XOR") operation on the magnitude bits and the sign bits as shown in the following formula:

$$\text{sign}_{\text{2-bit offset}} = \text{sign}_{\text{sign-magnitude}}$$

$$\text{magnitude}_{\text{2-bit offset}} = \text{Sign}_{\text{sign-magnitude}} \text{XOR magnitude}_{\text{sign-magnitude}}$$

Downsampler Process

The downsampler converts the captured signal (real 16.368 MHz) to a 1.024 MHz complex signal. This operation is performed to reduce the amount of memory needed to store the received signal and to reduce the amount of processing for satellite detection.

Figure 4:
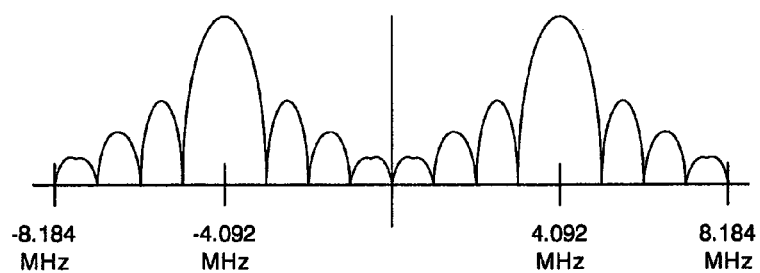
FIG. 4 shows the spectrum at the output of an A/D converter in accordance with embodiments of the present invention.

The internal architecture of the exemplary RF front end 300 is shown in FIG. 3. In this embodiment, the output sample rate equals 96 times the frequency of the mixer. Thus, if the output sample rate is 16.368 MHz, the mixer will operate at 1,571,328 MHz, and the GPS IF will be at 4.092 MHz. Note that the IF is exactly at the discrete-time frequency of $\pi/2$. The spectrum at the output of the A/D 340 is shown in FIG. 4.

Figure 5:
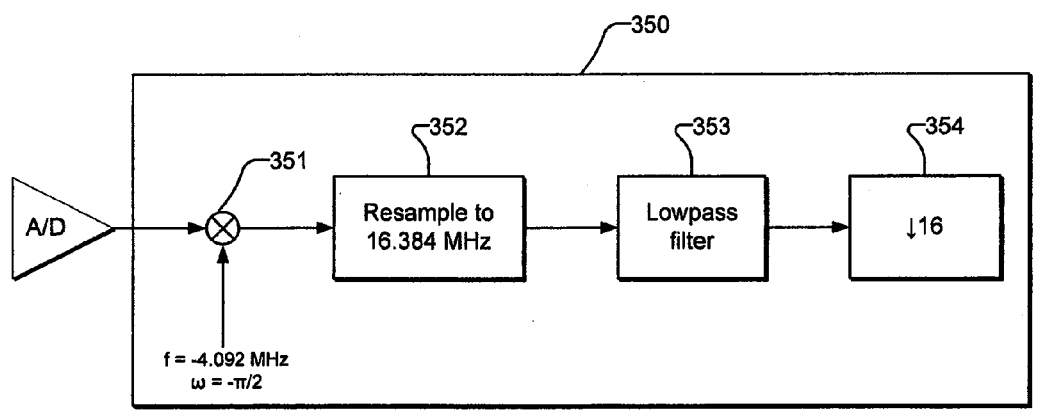
FIG. 5 is a block diagram of the high-level architecture for a real-time downsampler in accordance with embodiments of the present invention.

The downsampling occurs in real-time on one (1) millisecond segments of the received signal. The downsampling process occurs conceptually in four phases as shown in FIG. 5, which illustrates the high-level architecture for a real-time downsampler 350.

Figure 6A:
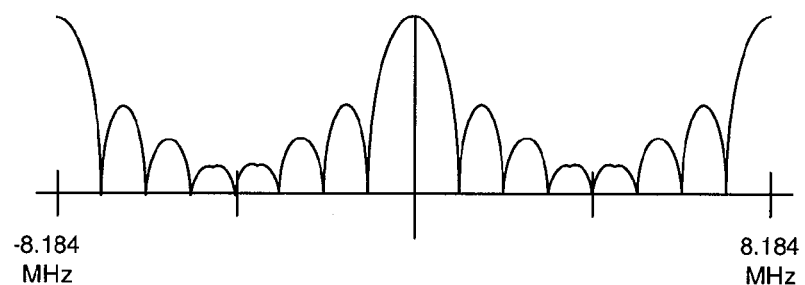
FIGS. 6A–6E show signals resulting from filtering and downsampling operations in accordance with embodiments of the present invention.

First, a mixing operation 351 is performed in which the GPS signal is mixed by -4.092 MHz. This shifts the positive frequency image of the GPS signal to DC. In discrete-time, this corresponds to the complex modulation {+1, -j, -1, +j, +, -j, -1, +j, . . . }. The resulting complex signal spectrum is shown in FIG. 6A.

Figure 6B:
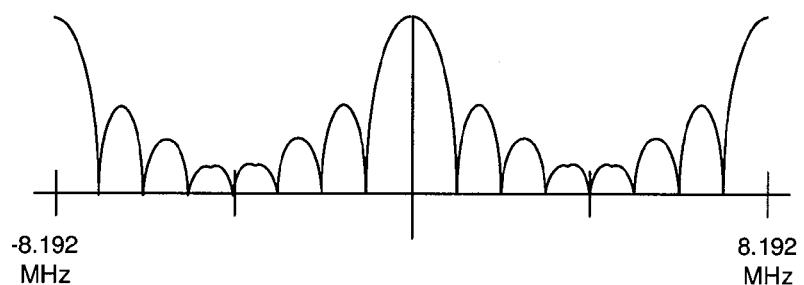

Next, a resampling operation 352 is performed in which the signal is resampled from 16.368 MHz to 16.384 MHz. This slight change in the sample rate can be accomplished by repeating one out of every 1,023 input samples. Over a one millisecond interval, this corresponds to inserting an additional 16 samples. The resulting frequency spectrum is shown in FIG. 6B.

Figure 6C:
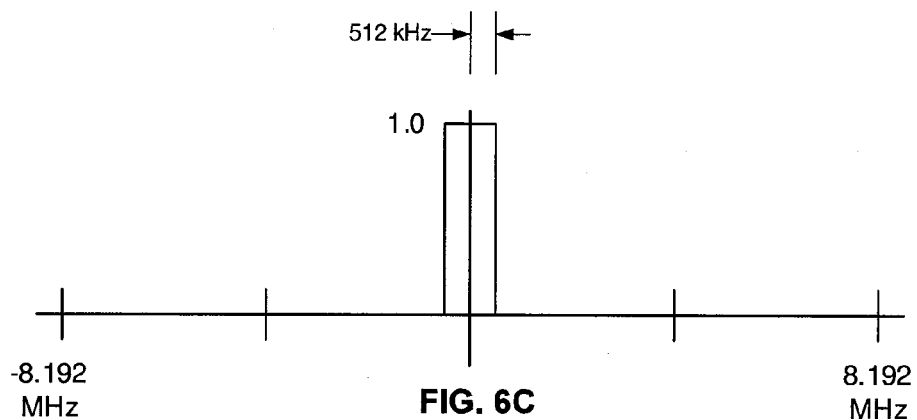
Figure 6D:
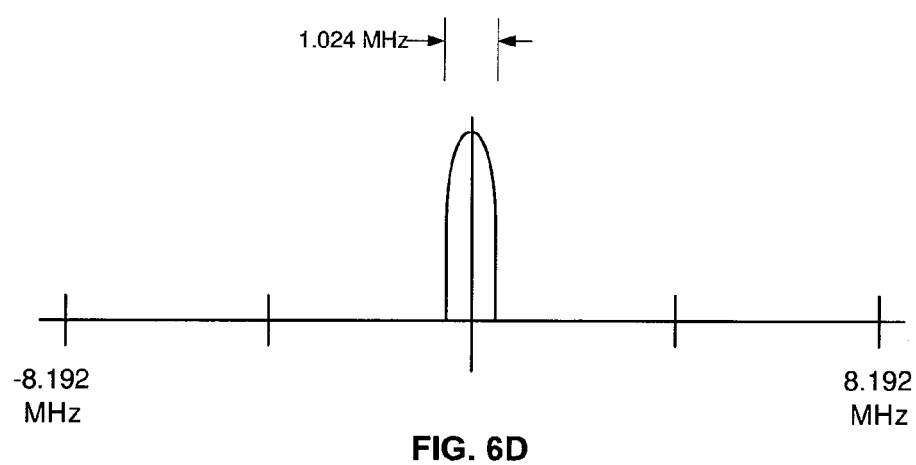

Next, a lowpass filter operation 353 is performed. This step filters out 1 MHz of signal centered around DC. The ideal filter shape is shown in FIG. 6C. This filter is symmetric and real. However, since the input is complex, the state variables and output will be complex as well. The actual output of the filter is shown in FIG. 6D.

Figure 6E:
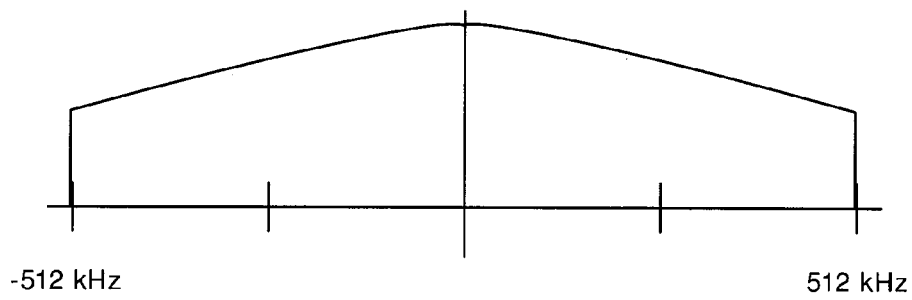

Finally, a downsampling operation 354 is performed in which the signal is downsampled by a factor of 16. This stretches the spectrum by a factor of 16 yielding the diagram shown in FIG. 6E.

The resampling operation 352 from 16.368 MHz to 16.384 MHz can be performed as follows. As described above, the RF data is received by two separate McBSPs. One captures sign bits and the other captures magnitude bits. This data is streamed to separate buffers located in internal memory. Each buffer contains 16,368 bits of data, or equivalently, 1023 16-bit words.

A "sub-block" of input data can be defined as $\frac{1}{16}^{th}$ of a millisecond of data. At 16.368 MHz, a sub-block contains 1,023 samples. At 16.384 MHz, a sub-block contains 1,024 samples. The conversion from 16.368 MHz to 16.384 MHz can be performed by adding one sample within every sub-block. The inserted sample can be generated in a variety of ways. For example, one of the samples in the sub-block can be duplicated to create the additional sample. In a preferred embodiment, a sample in the middle of the sub-block is duplicated, as shown in FIG. 7.

In accordance with embodiments of the present invention, an efficient polyphase implementation is used that combines the filtering operation 353 and the downsampling operation 354. Let h[n] denote the lowpass filter and assume that it has a length of 48 points.

Figure 8:
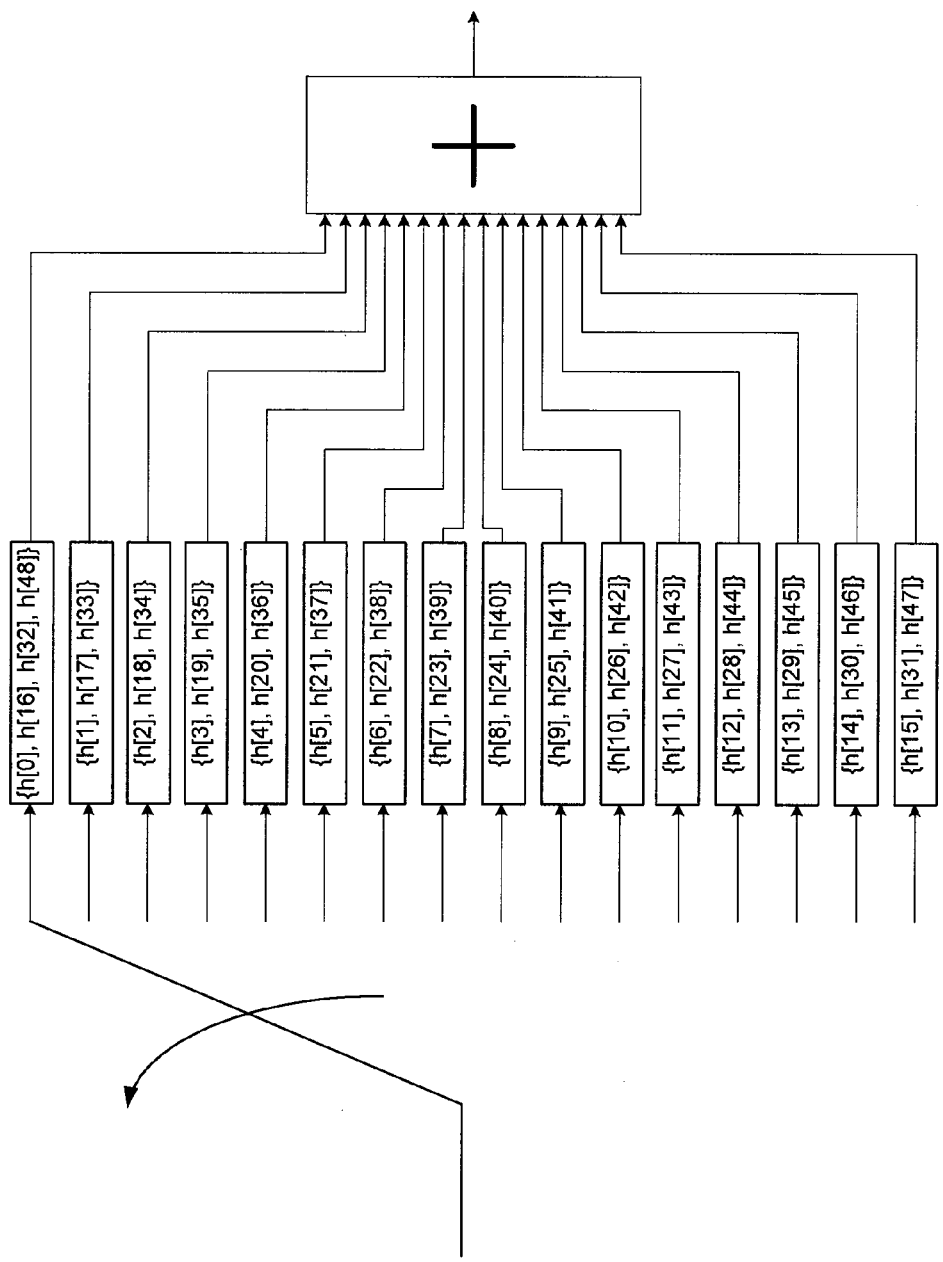
FIG. 8 shows a conventional polyphase downsampler implementation.
Figure 9:
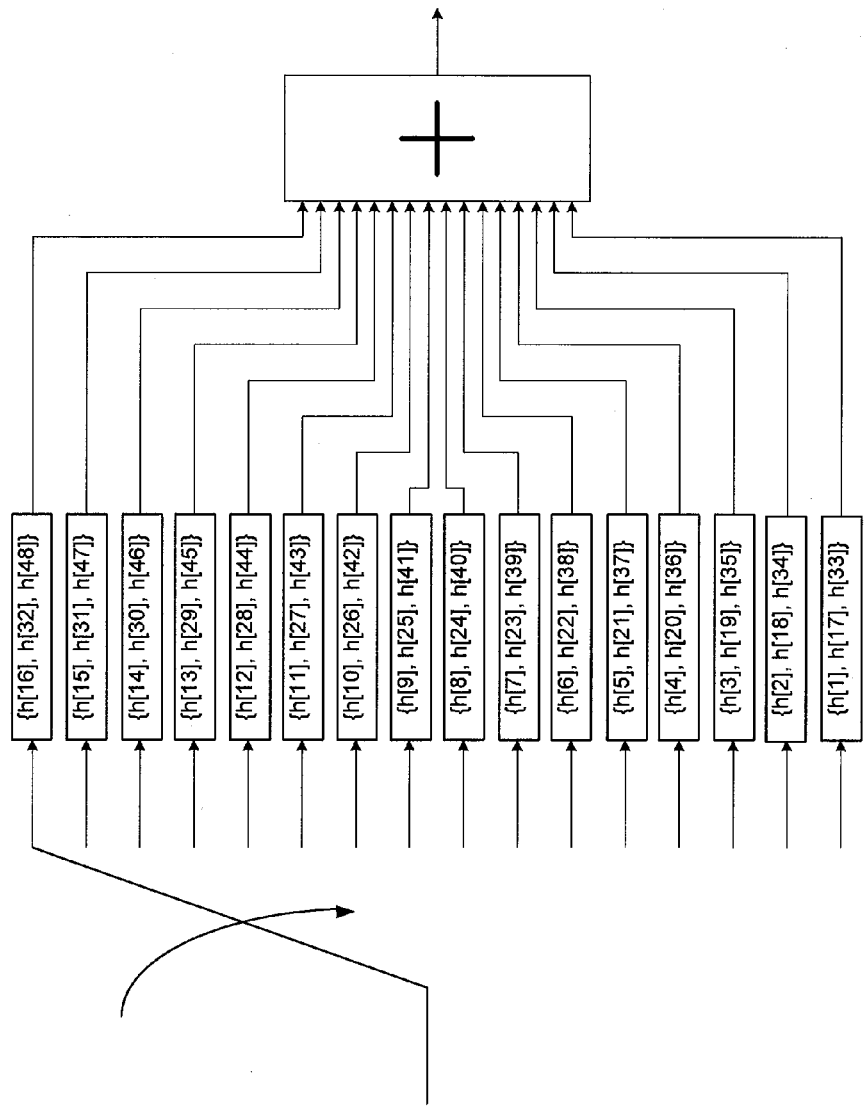
FIG. 9 shows a polyphase downsamper in which the filter coefficients are rearranged in accordance with embodiments of the present invention.

In a traditional polyphase implementation, the 48-point filter is divided into 16 short segments as illustrated in the conventional polyphase downsampler implementation shown in FIG. 8. The commutator rotates in a counter-clockwise fashion. At the transition from the top to bottom (at input sample times n=0, 16, 32, etc.), all 16 filter outputs are summed together to form the output. This structure is difficult to implement because the addition operation occurs after the first sample is received. It can be simpler to implement if the addition operation occurs after the first 16 samples have been received. Then by rearranging the filter coefficients, the structure in FIG. 9 is achieved in which the input is processed in 16 sample blocks. In this implementation, the addition operation occurs at the transition from the bottom filter to the top. This occurs after each group of 16 input samples has been received.

This structure can be efficiently implemented using 16 lookup tables. Let bits {S[N], M[N]} represent the sign and magnitude bits of the $N^{th}$ input sample. A 2-bit index {S[N], M[N]} is formed and used to access a lookup table. The $k^{th}$ lookup table will contain the impulse response of the $k^{th}$ polyphase component, and this impulse response will be three complex samples long. Each lookup table will contain: 4(2 bits)×3(length of polyphase component)×2(real and imaginary)=24 words of data.

Figure 10:
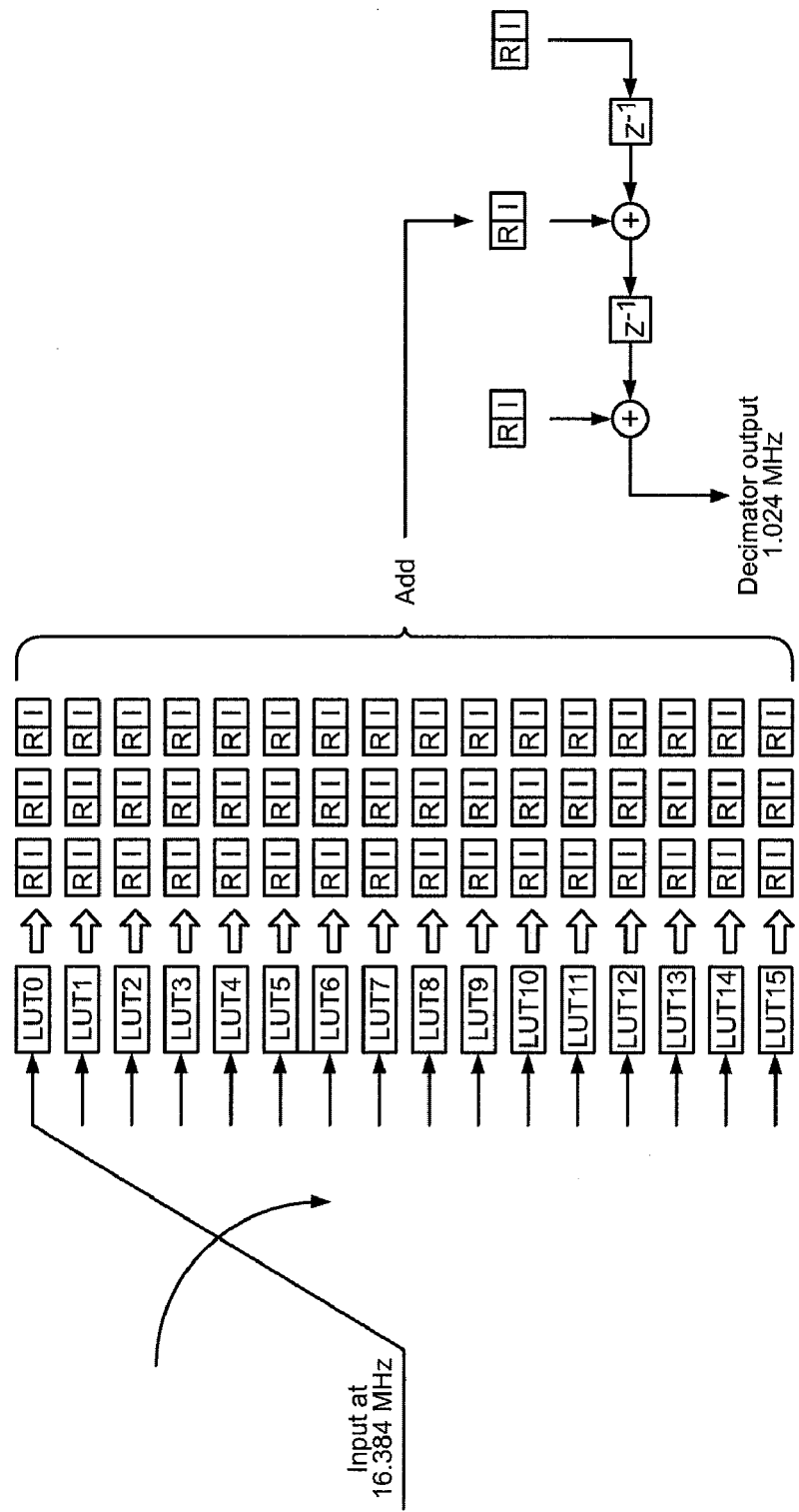
FIG. 10 shows a polyphase downsampler that accumulates complex samples in accordance with embodiments of the present invention.

The table lookup is performed 16 times, once for each polyphase component, and the results from all of the table lookups are added. The resulting three complex values represent the net contribution to the output due to the 16 input samples that were processed. The final operation is to accumulate these three complex samples into a shift register. In effect, the output of an FIR filter is calculated by adding together individual contributions from each input sample. One complex word of the shift register is shifted out, and this is the output at 1.024 MHz. The overall process is illustrated in FIG. 10, which shows an efficient implementation using 16 lookup tables, each with a 2-bit index.

In accordance with another embodiment, the size of the lookup table can be increased to further optimize the operation of the downsampler. Instead of looking up two bits at a time, four input samples are grouped and an 8-bit index is used. If N, N+1, N+2, and N+3 are the current input samples, the 8-bit index can be formed by ordering the bits as follows:

{S[N], S[N+1], S[N+2], S[N+3], M[N], M[N+1], M[N+2], M[N+3]}

S[k] represents the sign bit of sample k and M[k] represents the magnitude bit of sample k. The system now incorporates four lookup tables, each with an 8-bit index as shown below. Since the outputs of the lookup tables in FIG. 10 are all added together, we can add the results together when forming the larger lookup tables. That is, the first lookup table would contain entries of the form:

v0*[h[15], h[31], h[47]]+v1*[h[14], h[30], h[46]]+ v2*[h[13], h[29], h[45]]+v3*[h[12], h[22], h[44]]

v0 is the value represented by the first input sample (−¾, −¼, +¼, +¾), v1 is the value represented by the second input sample, and so on. Other tables would be calculated in a similar fashion.

Figure 11:
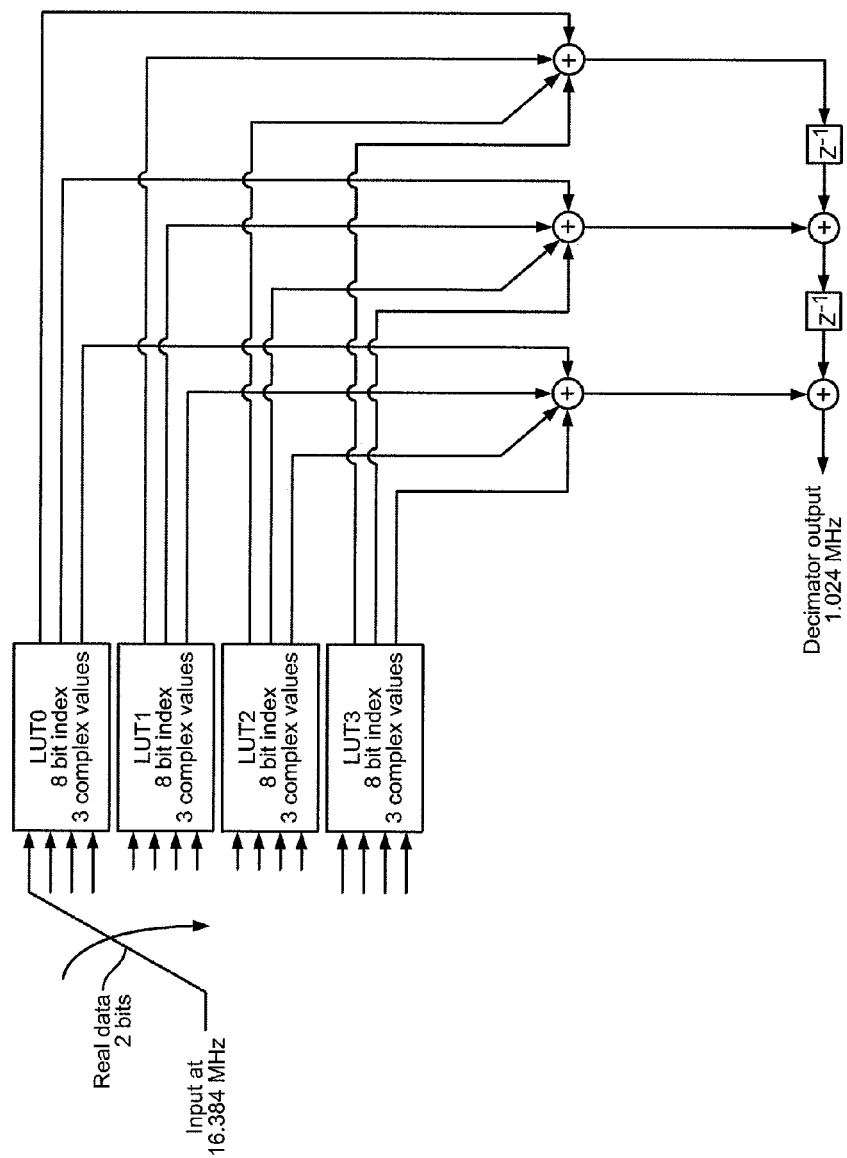
FIG. 11 shows a polyphase implementation using four 8-bit lookup tables in accordance with embodiments of the present invention.

Each table would still output three complex words. The total size of each table is: 256(8 bits)×3(length of polyphase component)×2(real and imaginary)=1536 words of data. There are four different tables, thereby utilizing 6144 words of data. This is shown in FIG. 11, which illustrates an efficient polyphase implementation using four 8-bit lookup tables.

In accordance with another embodiment of the present invention, by taking advantage of the linear relationship between sign and magnitude bits discussed above, a system can be derived which only uses two different lookup tables. The first 8-bit lookup table, LUT0, is constructed using the sign bits for the first eight input samples. Entries are of the form:

s0*[h[15], h[31], h[47]]+s1*[h[14], h[30], h[46]]+ s2*[h[13], h[29], h[45]]s3*[h[12], h[28], h[44]]+s4*[h[11], h[27], h[43]]+s5*[h[10], h[26], h[42]]+s6*[h[9], h[25], h[41]]+s7*[h[8], h[24], h[40]]

s0 is the value represented by the sign bit of the first input sample {−½ or +½}, s1 is the value represented by the sign bit of the second input sample, and so on. The second 8-bit lookup table, LUT1, is built using the sign bits for the second set of eight input samples. Entries are of the form:

s8*[h[7], h[23], h[39]]+s9*[h[6], h[22], h[38]]+s10* [h[5], h[21], h[37]]+s11*[h[4], h[20], h[36]]+ s12*[h[3], h[19], h[35]]+s13*[h[2], h[18], h[34]]+s14*[h[1], h[17], h[33]]+s15*[h[0], h[16], h[32]].

Figure 12A:
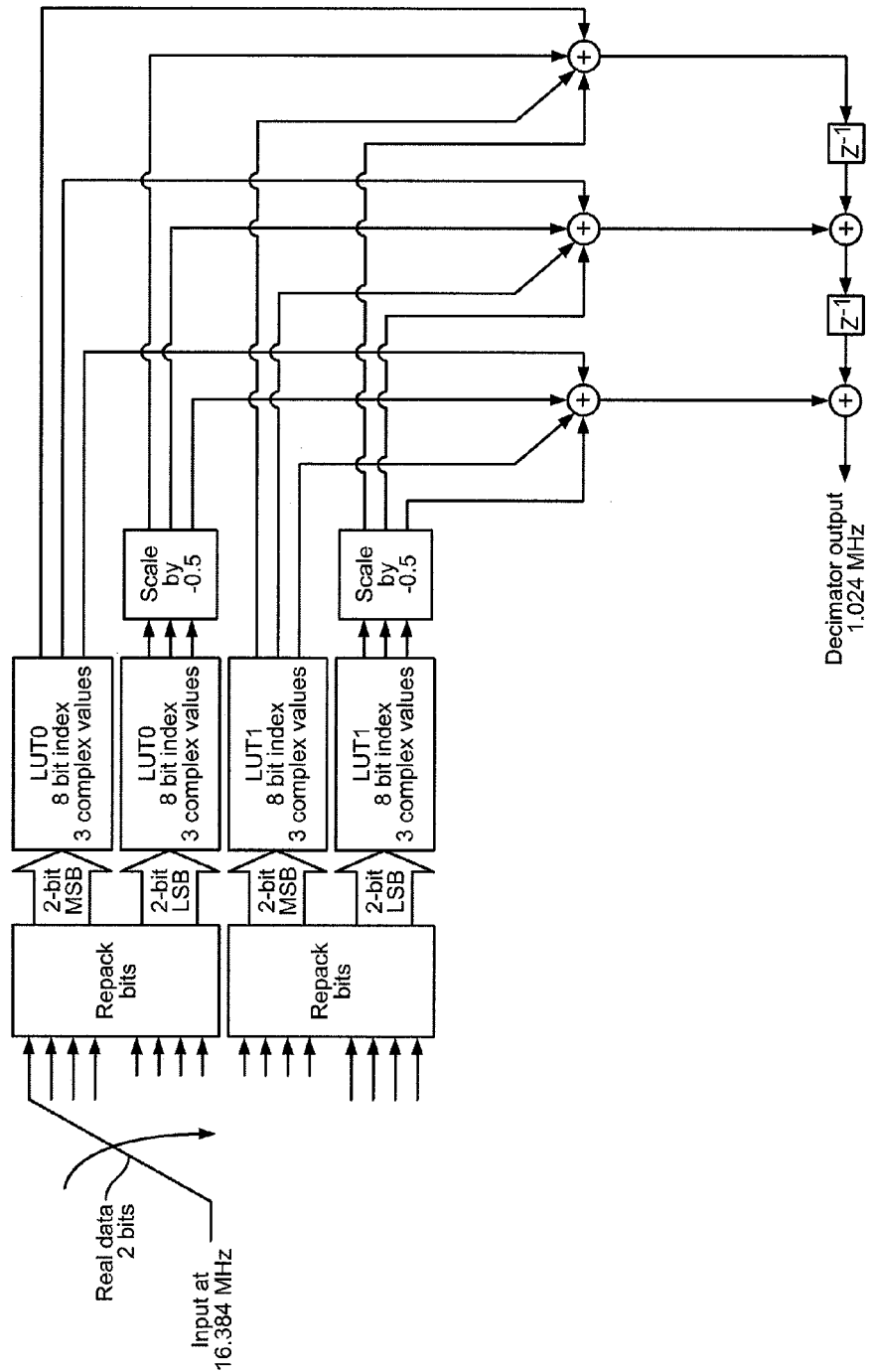
FIG. 12A shows a polyphase implementation using two 8-bit lookup tables in accordance with embodiments of the present invention.

Using these two 8-bit lookup tables, the downsampler can be implemented as shown in FIG. 12A. The first table lookup uses LUT0 and the MSB bits from the 2-bit offset representation (which correspond to the sign bit) from the first eight samples as an index. The second table lookup uses LUT0 and the LSB bits from the 2-bit offset representation (which correspond to the sign-XOR-magnitude bit) from the first eight samples as an index. The third and fourth table lookups use the next eight samples and LUT1.

The 8-bit index corresponds to three complex words within each table. Each complex word consists of 16-bits of real data followed by 16-bits of imaginary data. Thus, each table entry has a total of six words of data. When performing a table lookup, the table is read at address:

TableStart+(6*index)

At this point, the data will be ordered as: real[0], imag[0], real[1], imag[1], real[2], imag[2].

In accordance with embodiments of the present invention, the lookup tables are also used to perform the mixing operation 351 shown in FIG. 5. The implementation illustrated in FIG. 12A does not include the initial modulation shown in FIG. 5. This modulation by $e^{-j(\pi/2)n}$ is equivalent to multiplying the input samples by the sequence {+1, −j, −1, +j, +1, −j, −1, +j, ...}. This repeats every four samples and can thus be embedded together with the lookup table operation. When calculating the lookup tables, the following entry form is used:

s0*(+1)[h[15], h[31], h[47]]+s1*(−j)[h[14], h[30], h[46]]+s2*(−1)[h[13], h[29], h[45]]+s3*(+j)[h [12], h[28], h[44]]+s4*(+1)[h[11], h[27], h[43]]+s5*(−j)[h[11], h[26], h[42]]+s6*(−1)[h [9], h[25], h[41]]+s7*(+j)[h[8], h[24], h[40]]

and s8*(+1)*[h[7], h[23], h[39]]+s9*(−j)*[h[6], h[22], h[38]]+s10*(−1)*[h[5], h[21], h[37]]+s11*(+j)* [h[4], h[20], h[36]]+s12*(+1)*[h[3], h[19], h[35]]+s13*(−j)*[h[2], h[18], h[34]]+s14*(−1)* [h[1], h[17], h[33]]+s15*(+j)*[h[0], h[16], h[32]].

Figure 12B:
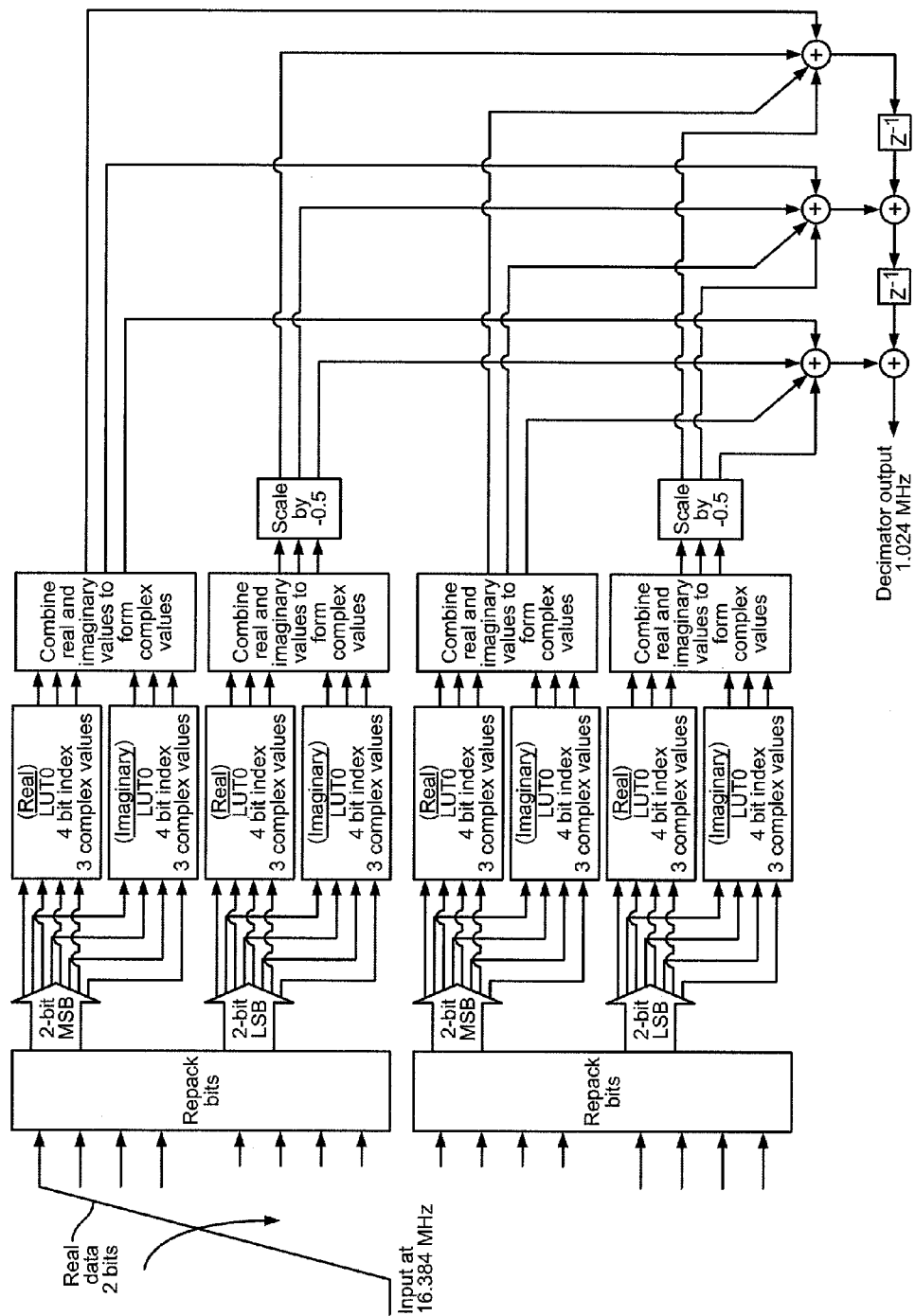
FIG. 12B shows a polyphase implementation using two 4-bit lookup tables in accordance with embodiments of the present invention.

The lookup tables can be further reduced in size by a factor of 2 when the sample rate compression value is a multiple of 2 and we are modulating by $e^{-j(\pi/2)n}$. For these cases, the even numbered input samples will only produce real output samples and the odd numbered input samples will only produce imaginary output samples. So the 8-bit indexes described above with respect to FIG. 12A used to lookup complex data can be converted to 4-bit indexes used to lookup real data for one set of the 4-bits and imaginary data for the second set of 4-bit data. An example of this implementation is shown in FIG. 12B. In other embodiments, the odd numbered input samples will produce real output samples and the even numbered input samples will produce the imaginary output samples. When calculating the lookup tables, the following entry form is used:

s0*(+1)[h[15], h[31], h[47]]+s2*(−1)[h[13], h[29], h[45]]+s4*(+1)[h[11], h[27], h[43]]+s6*(−1)[h [9], h[25], h[41]]

and s8*(+1)*[h[7], h[23], h[39]]+s10*(−1)*[h[5], h[21], h[37]]+s12*(+1)*[h[3], h[19], h[35]]+s14*(−1)* [h[1], h[17], h[33]]

and s1*(−j)[h[14], h[30], h[46]]+s3*(+j)[h[12], h[28], h[44]]+s5*(−j)[h[10], h[26], h[42]]+s7*(+j)[h [8], h[24], h[40]]

and s9*(−j)*[h[6], h[22], h[38]]+s11*(+j)*[h[4], h[20], h[36]]+s13*(−j)*[h[2], h[18], h[34]]+s15*(+j)* [h[0], h[16], h[32]].

Figure 13:
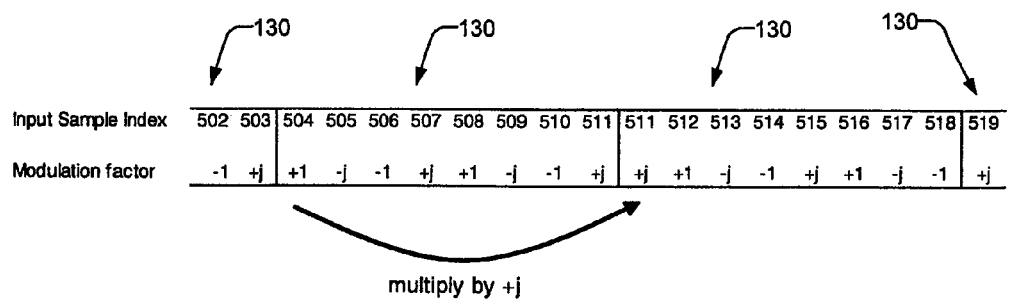
FIG. 13 shows a portion of a sample duplication matrix in accordance with embodiments of the present invention.

In this embodiment, this modulation occurs prior to the insertion of the additional sample. Thus, when a sample is duplicated, the modulation value is duplicated as well. FIG. 13 shows the first row of the sample duplication matrix from FIG. 7 together with the modulation value. The boxes 130 represent the eight sample groups that are combined to look up entries in the lookup table 8-bit index. In this example, sample 511 is duplicated. Sample 511 appears as the last sample in an index as well as the first sample in the next index. The modulation sequence applied to the eight-sample groups was $\{+1, -j, -1, +j, +j, -j, -1, +j\}$ prior to duplication. After sample duplication, the modulation sequence is $\{+j, +1, j, -1, +j, +1, -j, -1\}$. This new modulation differs by exactly a factor of +j. Thus, the lookup table is built using the modulation sequence $\{+1, -j, -1, +j, +1, -j, -1, +j\}$. The complex data is fetched and multiplied by +j.

Figure 14:
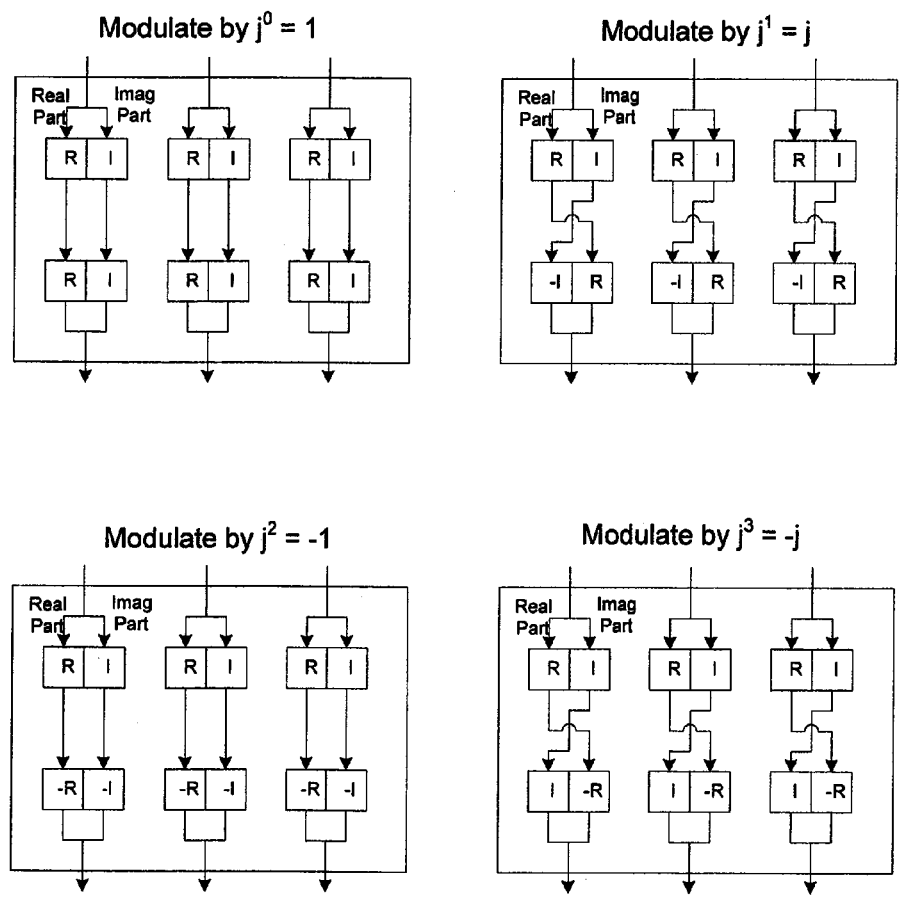
FIG. 14 shows a modulation operation in accordance with embodiments of the present invention.
Figure 15:
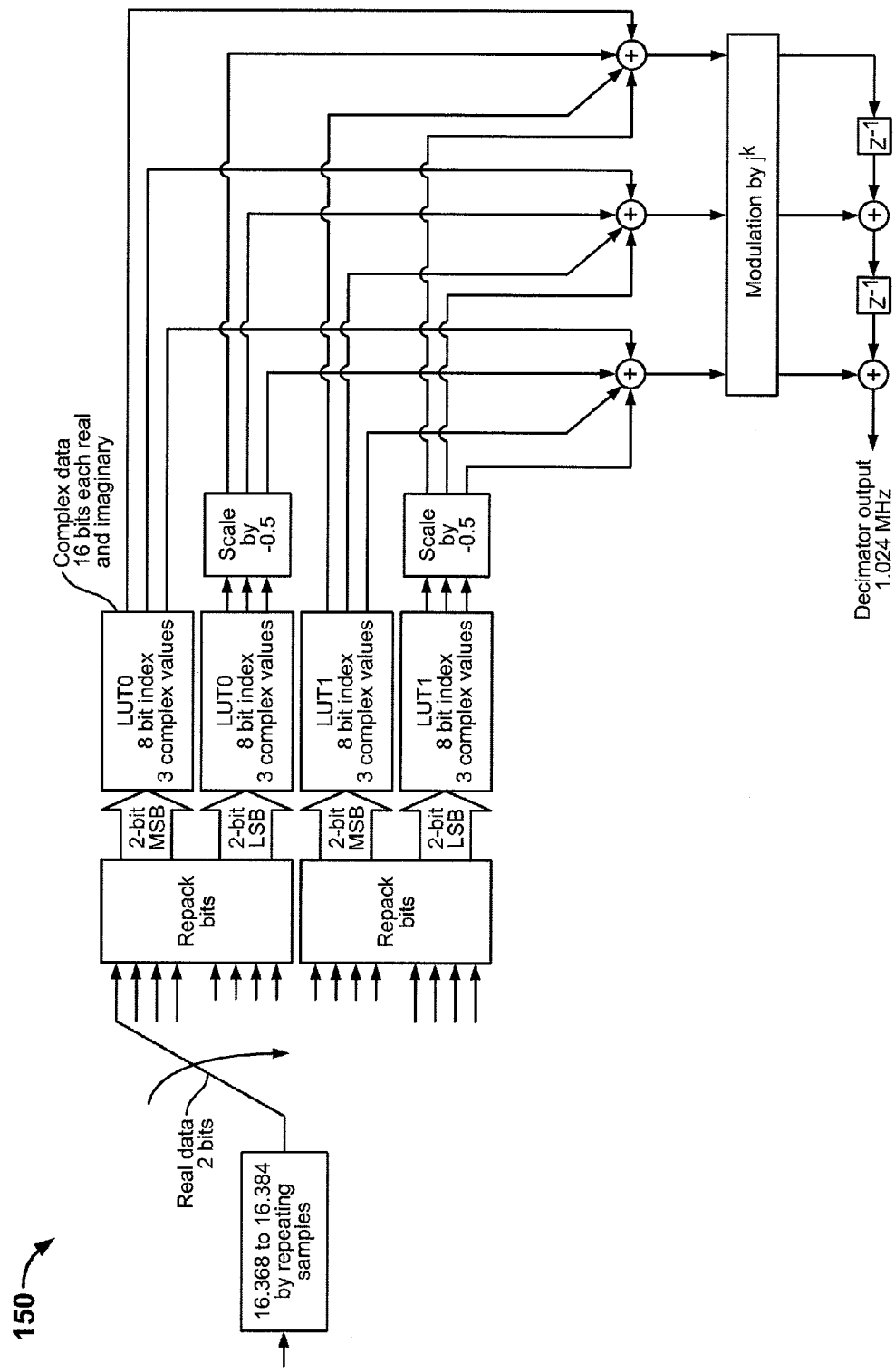
FIG. 15 shows a downsampler incorporating lookup tables for performing mixing operations in accordance with embodiments of the present invention.

The +j change in modulation will be repeated after each sample duplication and will be of the form $(+j)^k$, where k represents the number of sample duplications which have occurred thus far. This sequence repeats after every four sample duplications: $\{1, +j, -1, -j, etc.\}$ This modulation operation can be accomplished without multiplications by simply interchanging real and imaginary components and inverting signs. This is illustrated in FIG. 14, which shows efficient modulation by $(+j)^k$. FIG. 15 shows a downsampler 150 incorporating lookup tables which are also used to perform the mixing operation.

Figure 16:
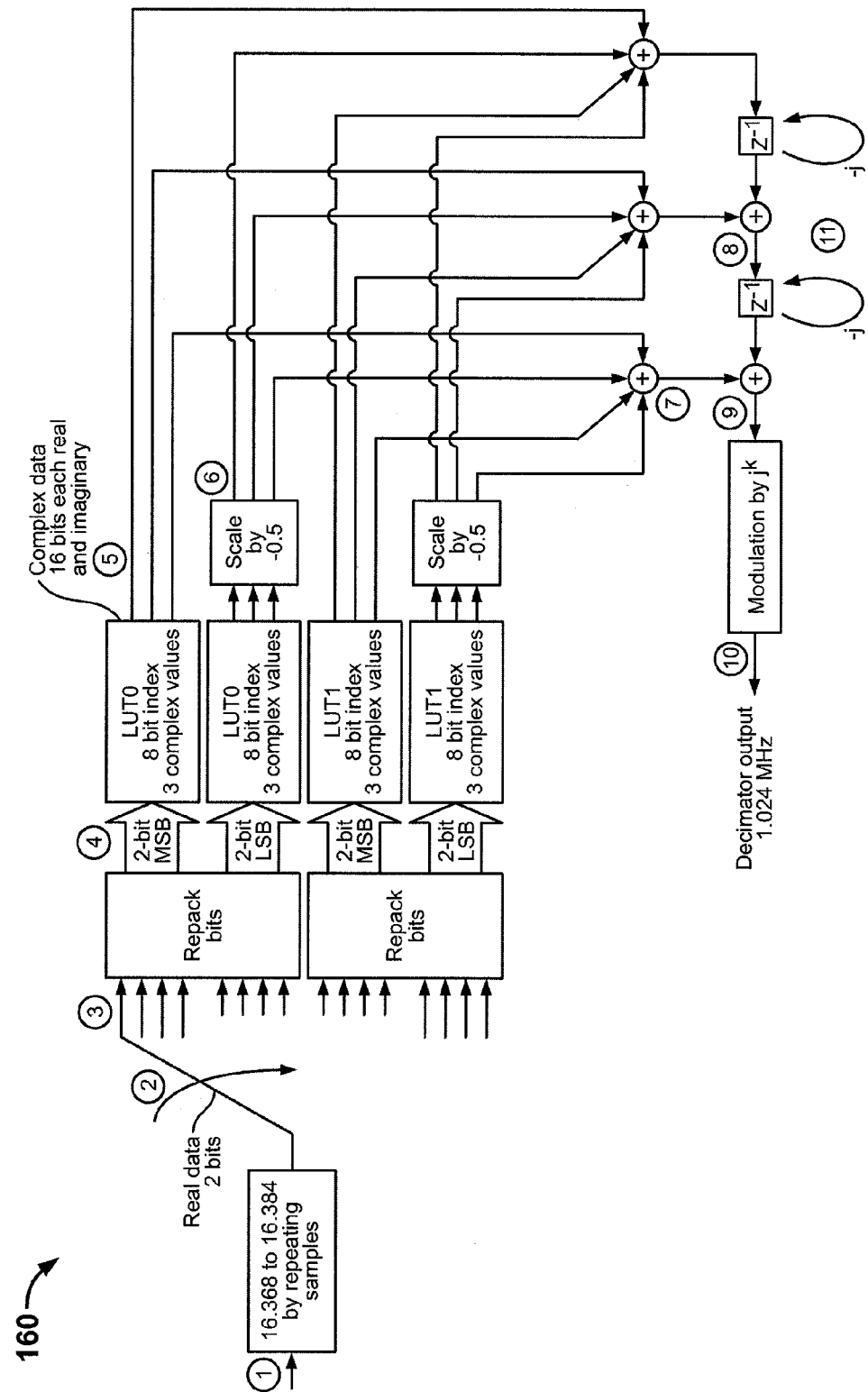
FIG. 16 shows another downsampler incorporating lookup tables for performing mixing operations in accordance with embodiments of the present invention.

In accordance with other embodiments of the present invention, the downsampler 150 shown in FIG. 15 can be further optimized. Assuming for the moment that the modulation $(j^k)$ that occurs after the additions remains constant over the entire one millisecond. Then, the modulation can be moved to the output of the accumulator chain, as shown in FIG. 16. When the modulation changes from $(j^k)$ to $(j^{(k+1)})$, the modulation at the output changes instantly from $(j^k)$ to $(j^{(k+1)})$, but the state variables within the delays should be modulated by $(j^k)$ not $(j^{(k+1)})$. Thus, when the modulation changes from $j^k$ to $j^{(k+1)}$, the state variables within the delays need to be multiplied by $j^{(-1)}=-j$. This gives a mathematically equivalent, but computationally more efficient implementation.

In summary, the downsampler 160 shown in FIG. 16 performs the following operations:

1. Input data arrives at a rate of 16,368 samples per millisecond.
2. Duplicate one out of every 1,023 input samples. Preferably, sample 511 is duplicated. This yields a signal with a sample rate of 16,384 samples per millisecond.
3. Group eight input samples together.
4. Form two 8-bit indexes using the most significant bits (MSB) and least significant bits (LSB) of a 2-bit offset representation (which correspond to the sign and sign-XOR-magnitude bits, respectively):
    a. Index0={MSB[N], MSB[N+1], MSB[N+2], MSB[N+3], MSB[N+4], MSB[N+5], MSB[N+6], MSB[N+7]}
    b. Index1={LSB[N], LSB[N+1], LSB[N+2], LSB[N+3], LSB[N+4], LSB[N+5], LSB[N+6], LSB[N+7]}
5. Lookup three complex words from lookup table 0 (LUT0) using the MSB bits.
6. Lookup three complex words from LUT0 using the LSB bits. Scale these by—0.5. Repeat for the next eight input samples.
7. Add the outputs of the four lookup tables together.
8. Add the result to a shift register.
9. Shift out one complex word.
10. Multiply the output by the modulation factor $j^k$. This yields the final result at 1.024 MHz.
11. Each time a sample is duplicated, change the output modulation factor from $j^k$ to $j^{k+1}$. Also multiply the state variables in the delays by $-j$.

EXAMPLE 1

6138375 Sample Rate Implementation

In accordance with another embodiment of the present invention, an efficient polyphase implementation is provided for input signals having a sample rate of 6138375 Hz. This embodiment utilizes a similar sequence of operations, as described above with respect to FIG. 5. First, the input sequence is modulated by $-\pi/2$, and samples are inserted. Next, the signal is low passed filtered by a FIR filter with a digital frequency cutoff of $\pi$/(sample rate compression value). The modulation by $-\pi/2$ is performed before the sample insertions because the input signal with sample rate of 6138375 needs to be shifted in frequency by 6138375/4 Hz. If the modulation was done after the insertions, that would shift the signal in frequency by 6144000/4 Hz.

To change the sample rate of 6138375 to 1024000, 5625 samples per second are inserted, and then the signal is downsampled by 6, as shown by the following equation:

(6138375+5625)/6=1024000

In accordance with some embodiments, the system is further optimized by inserting two samples at a time instead of one. An advantage provided by doing so is that the insertion can be multiplied by $-1$ instead of +j. This keeps all the even numbered samples producing real values and all of the odd numbered samples producing imaginary values. Accordingly, 2812.5 pairs of insertions are performed per second. This is equivalent to performing a pair of insertions for every 364.08888 output samples.

1024000/2812.5=364.08888

Thus, a pair of insertions can be performed for every 364 or 365 output samples. Inserting at these times produces errors of $-0.08888$ and $0.911111$.

364−364.08888=−0.08888

365−364.08888=0.91111

A running sum of this error is maintained. If the total error becomes greater than or equal to zero, the next insertion is performed in 364 output samples, and if the error is less than zero, the next insertion is performed in 365 output samples. Because the error numbers are relative to each other, the error adjustments can be multiplied by any number. If multiplied by 45, integer errors of $-4$ and 41 are obtained. The integer adjustments can be used to modify the running sum of sample rate error.

Given a 48-sample FIR and a modulation of $-\pi/2$ $\{+1, -j, -1, +j, +1, -j, -1, +j, +1, -j, -1, +j \ldots\}$ a particular output is obtained. If six samples (or sample rate compression value amount) are skipped, then the modulation changes sign $\{-1, +j, +1, -j, -1, +j, +1, -j, -1, +j \ldots\}$. Thus, if given the same 48 input samples as before but with six samples skipped, the output would be the negative of what it was before. Accordingly, the sign of every other output is changed. This negation is only needed with the sample rate compression value that is a multiple of 2 but not a multiple of 4 and when modulating by $-\pi/2$.

A 6-bit index is computed from the sign and magnitude bits. For the sign bits, eight 16-bit real values and eight 16-bit imaginary values are looked up. The lookup values are added to eight real accumulators and eight imaginary accumulators. For the sign-XOR-magnitude bits, eight 16-bit real values and eight 16-bit imaginary values are also obtained. Half of the sign-XOR-magnitude look up values are subtracted from the accumulators. One complex value is shifted out and saved from the accumulators for the output. If an insertion is needed, the input bits are shifted by 4. Otherwise, the input bits are shifted by 6. When an insertion is done, the sign modification on the output should be the same as the previous output instead of alternating like usual. In addition, when an insertion is done, the signs on the accumulators will need to be changed.

EXAMPLE 2

Input Data Reordering

In accordance with another embodiment of the present invention, the RF front end generates a signal having sign and magnitude words that are packed into separate 16-bit words. Within each word, the samples are ordered starting from the least significant bit ("LSB"). Thus, the mapping between bit positions and sample times is:

| Bit | Sample |
|-----|--------|
| 0   | 0      |
| 1   | 1      |
| 2   | 2      |
| 3   | 3      |
| 4   | 4      |
| ... |        |
| 15  | 15     |

Figure 17:
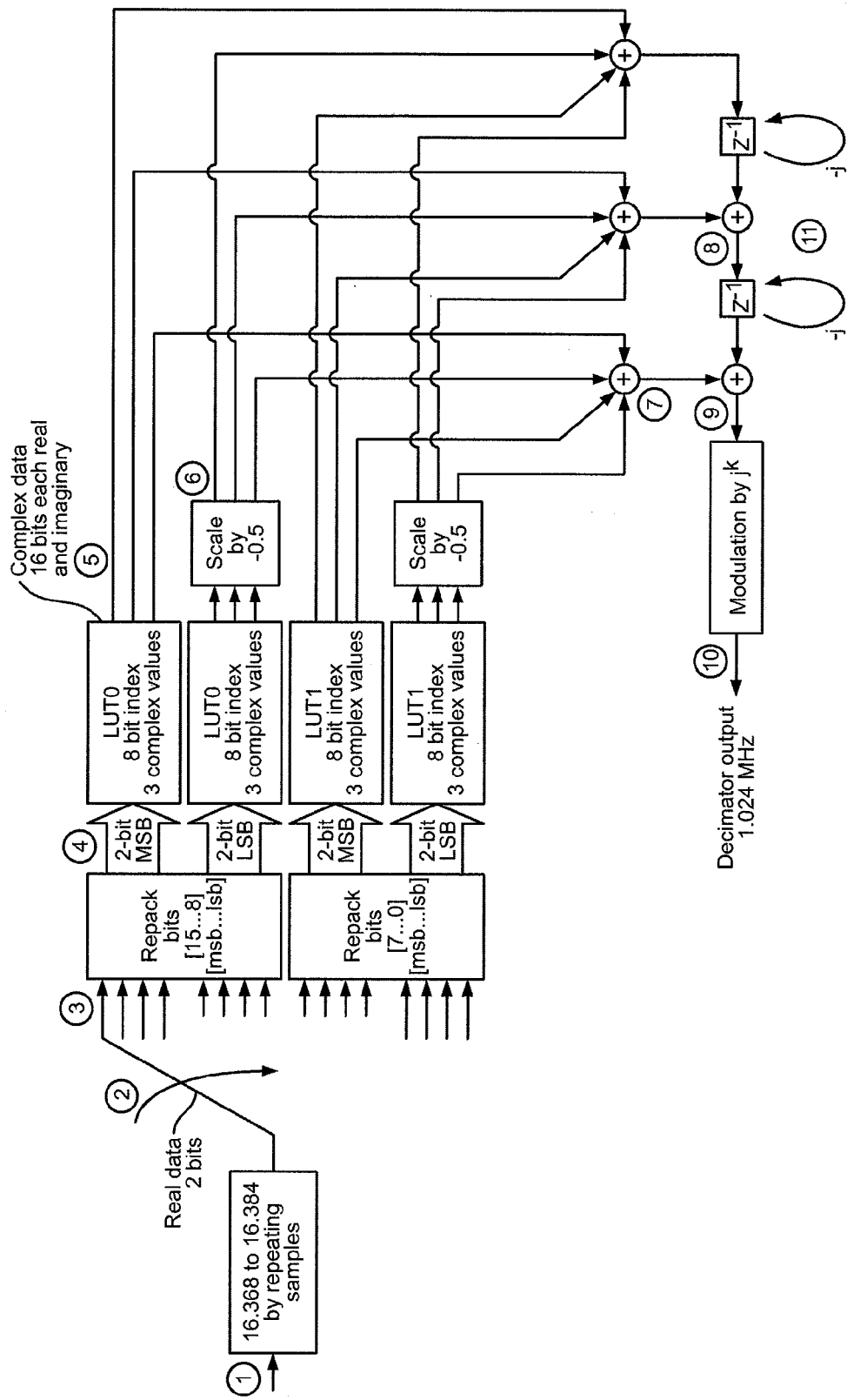
FIG. 17 shows another polyphase implementation accommodating a different input bit ordering in accordance with embodiments of the present invention.

The first 16-bit word generates two 8-bit indexes. The first index contains the following samples:
MSB LSB
[15 14 13 12 11 10 9 8]
The second index contains the following samples:
MSB LSB
[7 6 5 4 3 2 1 0]
FIG. 17 shows an efficient polyphase implementation in which the lookup tables have been modified to accommodate the different bit ordering on the inputs. This change to the bit ordering only affects the data in the tables—no other changes to the process are necessary.

EXAMPLE 3

16.384 MHz Sample Rate to 1.024 MHz

Figure 18:
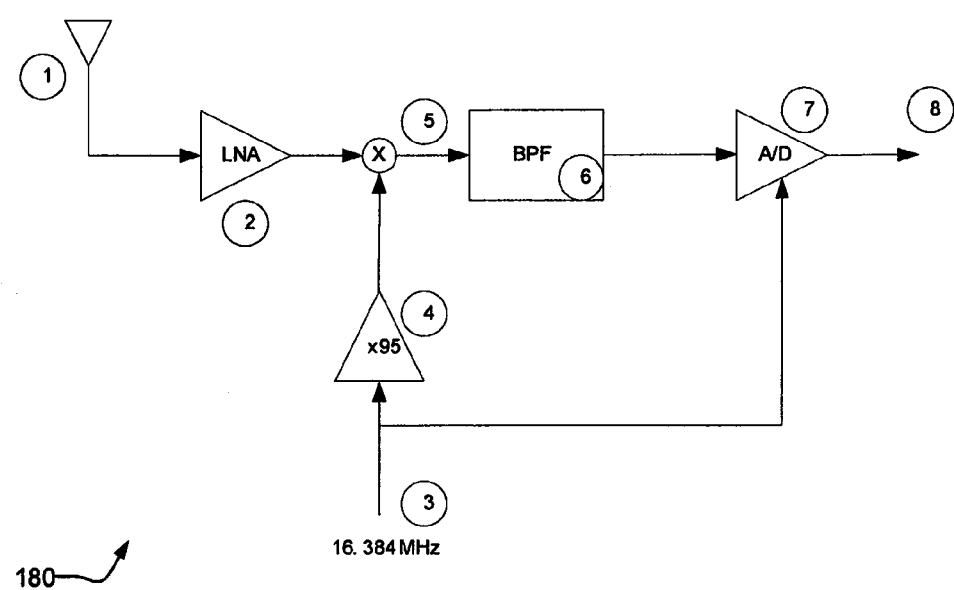
FIG. 18 shows another RF front end which may be used in conjunction with downsamplers in accordance with embodiments of the present invention.

In accordance with another embodiment of the present invention, an efficient polyphase implementation is utilized with an RF front end providing a 16.384 MHz sample rate. FIG. 18 shows an exemplary RF front end 180 providing a 16.384 MHz sample rate. One suitable RF front end 180 is the model no. TJ1004 RF front end from TChip Semiconductor SA of Manno, Switzerland. The operation of the RF front end 180 is as follows:
1. The GPS signals, centered at a frequency of 1575.42 MHz are received by the patch antenna.
2. A low noise amplifier ("LNA") adds 30 dB of gain to the signal, preventing the GPS signal from being corrupted by digital noise.
3. RF front end 180 has a single oscillator input of 16.384 MHz, which is used to generate the RF mixing frequency as well as the sampling clock.
4. RF front end 180 internally multiplies the 16.384 MHz input by 95 to produce a mixing frequency of 1556.48 MHz.
5. After mixing, the GPS signal is centered at an IF frequency of 18.94 MHz.
6. The IF signal is filtered by a band pass filter ("BPF") to remove out of band noise.
7. The IF signal is bandpass sampled at a frequency of 16.384 MHz. The A/D converter has 2-bit resolution: sign and magnitude.
8. The resulting output signal consists of real time domain data centered at a frequency of 2.556 MHz.

Figure 19:
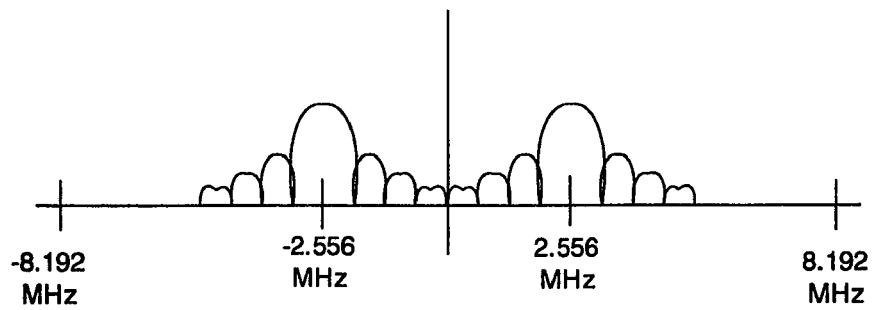
FIG. 19 shows the spectral output of the RF front end shown in FIG. 18.

The output of the RF front end 180 has the spectrum shown in FIG. 19.

Figure 20:
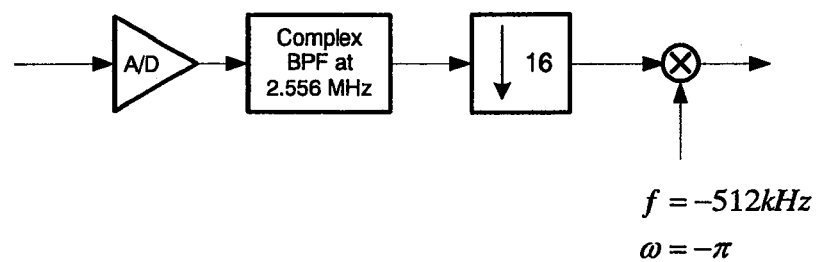
FIG. 20 shows the downsampler process in accordance with embodiments of the present invention.

The downsampling occurs in real-time on 1 millisecond chunks of the received signal. The downsampling process occurs conceptually in the three phases shown in FIG. 20.

Figure 21A:
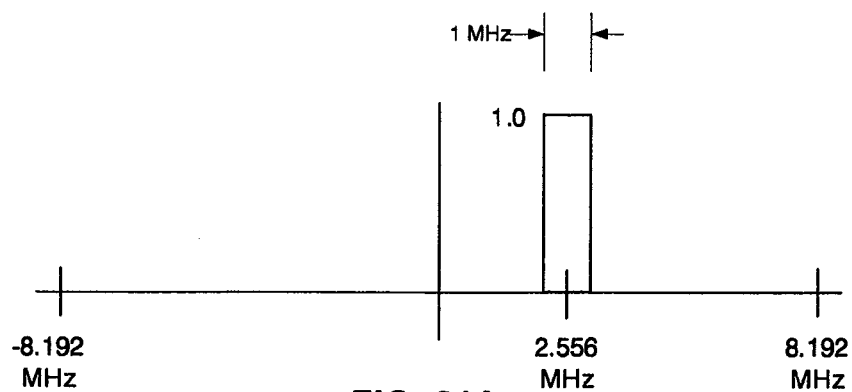
FIGS. 21A–21D show signals resulting from filtering and downsampler operations in accordance with embodiments of the present invention.
Figure 21B:
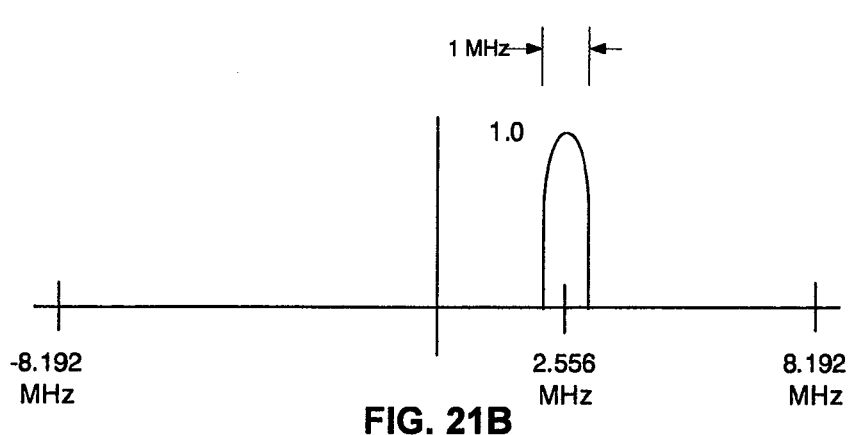

First, the bandpass filter is asymmetrical (complex) and is centered at 2.556 MHz. The filter has a bandwidth of 1 MHz and the ideal response shown in FIG. 21A. After filtering, the signal appears roughly as shown in FIG. 21B.

Next, the signal is downsampled by a factor of 16. This operation stretches the spectrum by a factor of 16. The signal centered at 2.556 MHz (2.556/8.192=0.312 $\pi$) gets mapped to:

$$0.312\pi \times 16 = 4.9922\pi$$

$$(4.9922\pi) \bmod (2\pi) = 0.99227\pi$$

$$= 508 \text{ kHz}$$

Figure 21C:
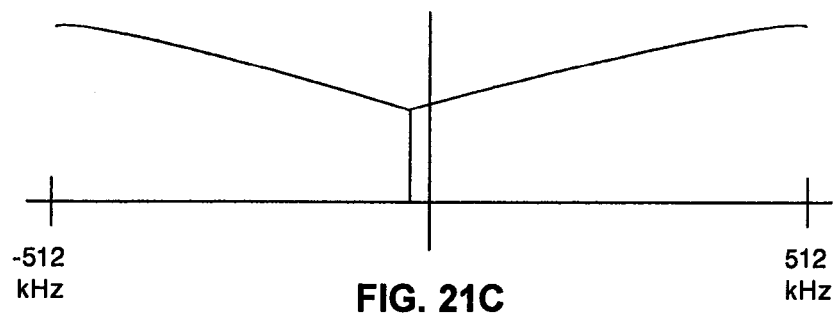
Figure 21D:
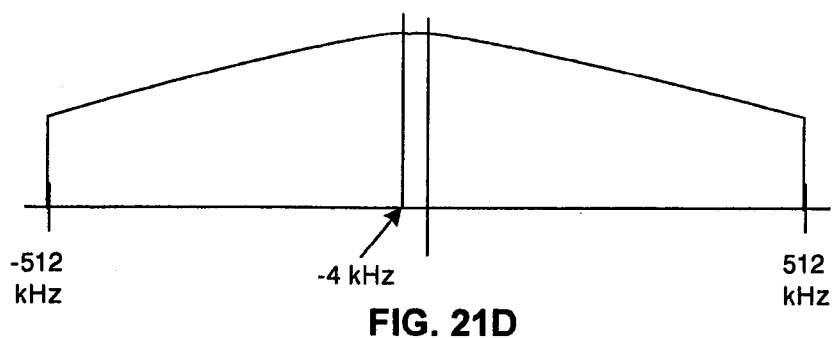

Finally, the signal is mixed by −512 kHz. This shifts the GPS signal so that it is centered around −4 kHz, as shown in FIG. 21C. The modulation is accomplished by multiplying by the sequence $\{+1, -1, +1, -1, +1, \ldots\}$. The final spectrum is shown in FIG. 21D.

Figure 22:
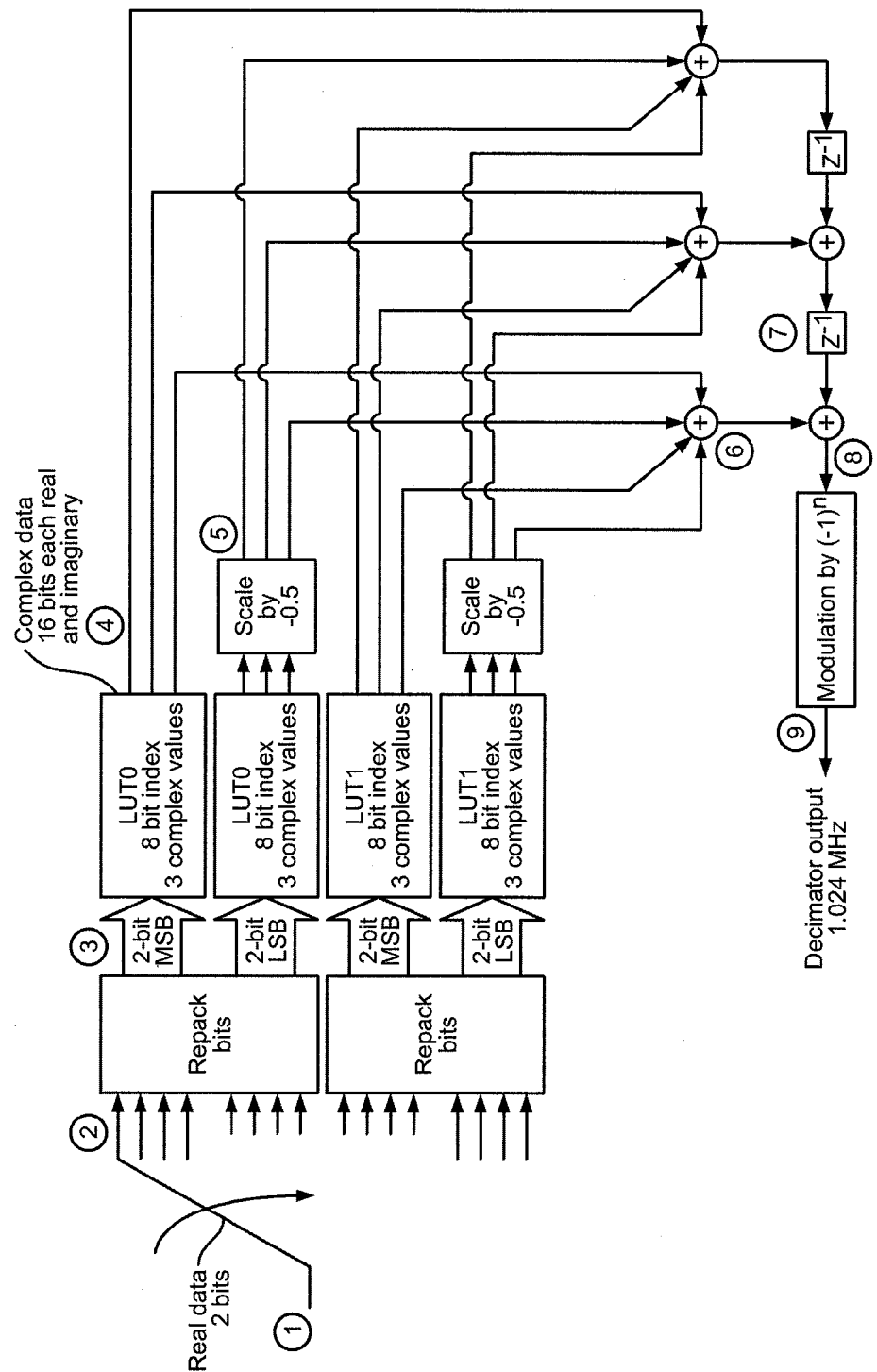
FIG. 22 shows a downsampler utilizing two lookup tables in accordance with embodiments of the present invention.

FIG. 22 shows a 16.384 to 1.024 MHz downsampler utilizing two lookup tables. The operation of this downsampler is similar to the operation described above with respect to FIG. 16. In summary, the steps performed by the downsampler are:
1. Input data arrives at a rate of 16,384 samples per millisecond.
2. Group eight input samples together.
3. Form two 8-bit indexes using the most significant bits (MSB) and least significant bits (LSB) of a 2-bit offset representation:
   a. Index0={MSB[N], MSB[N+1], MSB[N+2], MSB[N+3], MSB[N+4], MSB[N+5], MSB[N+6], MSB[N+7]}
   b. Index1={LSB[N], LSB[N+1], LSB[N+2], LSB[N+3], LSB[N+4], LSB[N+5], LSB[N+6], LSB[N+7]}
4. Look up three complex words from lookup table 0 (LUT0) using the MSB bits.
5. Look up three complex words from LUT0 using the LSB bits. Scale these by—0.5. Repeat for the next eight input samples.
6. Add the outputs of the four lookup tables together.
7. Add the result to a shift register.
8. Shift out 1 complex word.
9. Multiply the output by the modulation factor $(-1)^n$. This yields the final result at 1.024 MHz.

Figure 23:
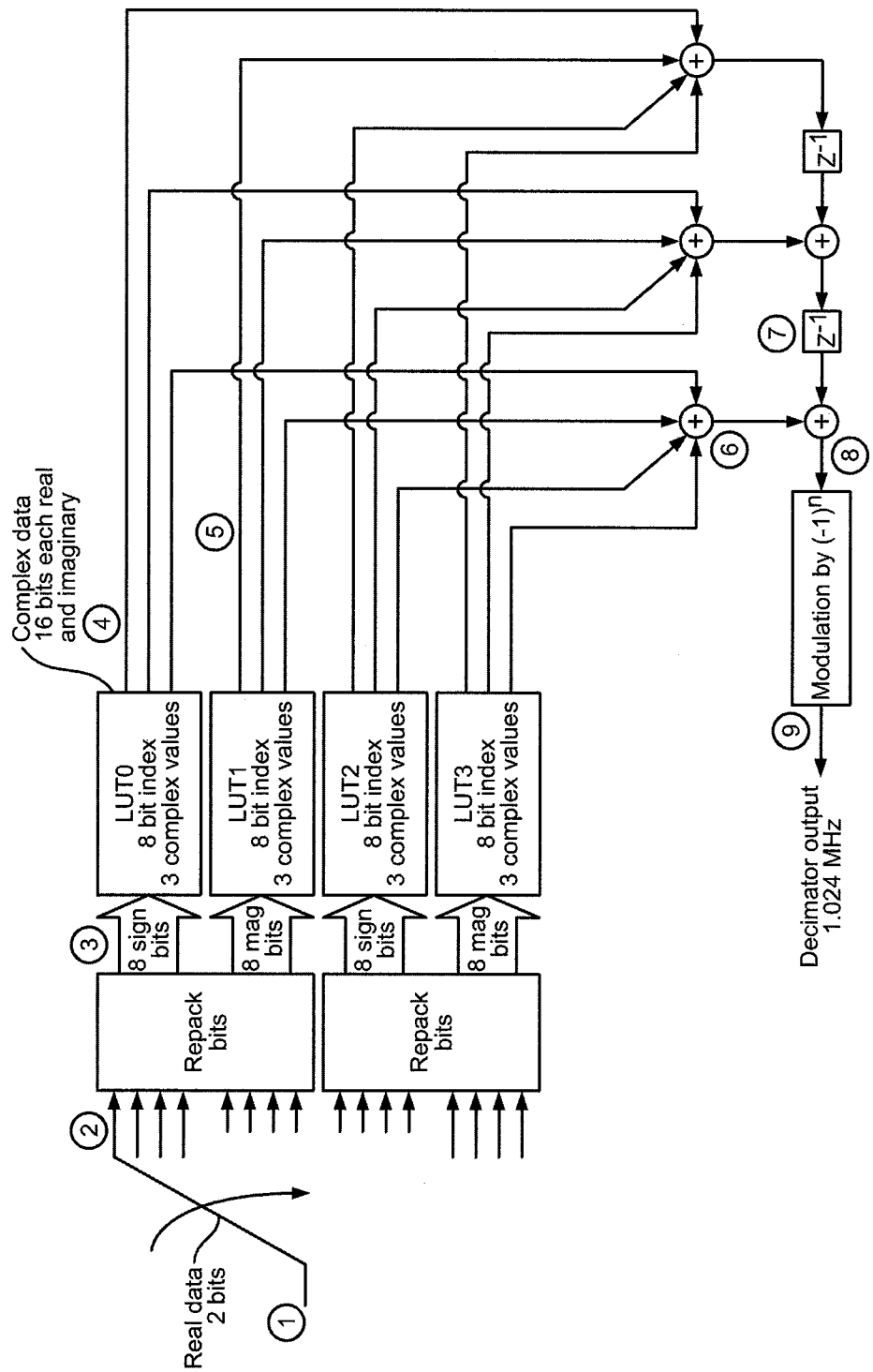
FIG. 23 shows another downsampler utilizing two lookup tables in accordance with embodiments of the present invention.

FIG. 23 shows another embodiment in which the scaling by −0.5 is incorporated into the lookup tables. This embodiment may be useful where the implementation is not limited by memory.

EXAMPLE 4

Magnitude Bit Transformation

In GPS applications, a typical input sample is only 1 to 4 bits. The following is an example for a typical 2-bit case in which there is a sign bit and a magnitude bit that represent the following values:

| Sign | Magnitude | Value |
|------|-----------|-------|
| 1    | 1         | −.75  |
| 1    | 0         | −.25  |
| 0    | 0         | .25   |
| 0    | 1         | .75   |

2-Bit Offset Format: The magnitude bit can be replaced with the Boolean operation (Sign^Magnitude), where "^" is the Boolean EXCLUSIVE-OR operation. These Boolean operations can be done in software or hardware. The resulting table is as follows. This data format will be referred to herein as a 2-bit Offset format, or OS2.

| Sign | (Sign ^ Magnitude) | Value |
|------|--------------------|-------|
| 1    | 0                  | −.75  |
| 1    | 1                  | −.25  |
| 0    | 0                  | .25   |
| 0    | 1                  | .75   |

EXAMPLE 5

Inserting and Deleting Samples

In some embodiments, the downsampling is by a non integer amount. A conventional way of performing this is to first interpolate by an integer amount then downsample by an integer amount such that the ratio is the proper amount. Another conventional method is to interpolate after downsampling by a non-integer amount using some type of curve fit operation. Both of these methods can be extremely time consuming.

As described above, samples can be inserted or deleted in order to allow for an integer downsampling to be performed. If the inserted or deleted samples are broadly interspersed, the loss caused by the insertion or deletion can be minimized. The low-pass filter operation can help to reduce loss. The number of insertions is equal to D*(Output_Sample_Rate−Input_Sample_Rate) per second. If this value is negative, then these samples are deleted rather than inserted. The basic loop described above is repeated for every output sample. The sample insertion/deletion can be a function of that repeated looping. Alternatively, the sample insertion/deletion could be a function of input samples, but making it a function of output samples is easier. As a result, every $\Psi$ sample is inserted or deleted, where $\Psi$ is calculated as:

$$\Psi = \frac{Output\_Sample\_Rate}{abs(D*(Output\_Sample\_Rate - Input\_Sample\_Rate))}$$

In many instances, the $\Psi$ value as calculated by the above equation is not an integer. If so, every floor ($\Psi$) or ceiling ($\Psi$) output sample is inserted or deleted. To decide when to use floor ($\Psi$) or ceiling ($\Psi$), a running sum error is maintained as follows:

if Error>0

Error=Error−Error_Scale*($\Psi$−floor ($\Psi$))

Next insertion or deletion in floor ($\Psi$) output samples else

Error=Error+Error_Scale*(ceiling ($\Psi$)−$\Psi$)

Next insertion or deletion in ceiling ($\Psi$) output samples

The Error_Scale term is a number used to make the values integers if the system is limited to integer math. Any number will work as long as it does not cause an overflow. In some embodiments, single samples are inserted or deleted. In other embodiments, multiple samples may be deleted at a time. To insert/delete pairs of samples, T is multiplied by two. The insertion/deletion of more than two samples at a time may increase loss undesirably. An advantage that can be obtained by inserting/deleting pairs of samples is that the real and imaginary accumulators can be separately maintained. Otherwise, if single samples are inserted/deleted, the accumulators would need to be switched. When inserting/deleting pairs of samples, the sign of the output is simply adjusted with each insertion or deletion. If D is even but not a multiple of four such that the sign of the output normally toggles, this can be accomplished using logic.

Quantization Operations

In accordance with certain embodiments, quantization operations are performed to reduce memory requirements. Embodiments of the downsampler described above generate 16-bit signed data in a fractional format that allows numbers in the range [−1+1) to be represented. The data is then quantized to 2-bit or 4-bit offset representations. These numerical representations will be labeled OS2 for 2-bit offset representations and OS4 for 4-bit offset representations.

For OS2, the allowable values are {−¾, −¼, +¼, +¾}. These values are represented in 16-bit signed data as:

| Numerical value | Sign bit | Mag bit | 16-bit representation |
|-----------------|----------|---------|-----------------------|
| −¾              | 1        | 0       | 10100000 00000000     |
| −¼              | 1        | 1       | 11100000 00000000     |
| +¼              | 0        | 0       | 00100000 00000000     |
| +¾              | 0        | 1       | 01100000 00000000     |

In the 16-bit representation, the bits can be labeled 0 (LSB) to 15 (MSB). Here, the sign and magnitude bits are stored in the 15th and 14th bit locations, and a constant value of 1 is stored in the 13th bit. Thus, to convert from OS2 to 16-bit, simply populate the high two bits with the OS2 representation, and set the 13th bit to 1.

Converting from 16-bit to OS2 can be performed as follows. The two high bits of the 16-bit value are the corresponding OS2 value, and the remaining bits are truncated. In this mapping, the following ranges of 16-bit values map to the four possible OS2 values:

| | | | | | |
|---|---|---|---|---|---|
| 10000000 00000000 | to | 10111111 11111111 | -> | -¾ |
| -1.0 | to | -0.50003051757813 | | |
| 11000000 00000000 | to | 11111111 11111111 | -> | -¼ |
| -0.5 | to | -0.00003051757813 | | |
| 00000000 00000000 | to | 00111111 11111111 | -> | +¼ |
| 0 | to | 0.49996948242188 | | |
| 01000000 00000000 | to | 01111111 11111111 | -> | +¾ |
| 0.5 | to | 0.99996948242188 | | |

For OS4, the allowable values are $\{-15/16, -13/16, -11/16 \ldots -1/16, +1/16, \ldots, +11/16, +13/16, +15/16\}$ and these are represented in the 16-bit representation as:

| Numerical value | OS4 | 16-bit representation |
|---|---|---|
| -15/16 | 1000 | 10001000 00000000 |
| -13/16 | 1001 | 10011000 00000000 |
| -11/16 | 1010 | 10101000 00000000 |
| -9/16 | 1011 | 10111000 00000000 |
| -7/16 | 1100 | 11001000 00000000 |
| -5/16 | 1101 | 11011000 00000000 |
| -3/16 | 1110 | 11101000 00000000 |
| -1/16 | 1111 | 11111000 00000000 |
| +1/16 | 0000 | 00001000 00000000 |
| +3/16 | 0001 | 00011000 00000000 |
| +5/16 | 0010 | 00101000 00000000 |
| +7/16 | 0011 | 00111000 00000000 |
| +9/16 | 0100 | 01001000 00000000 |
| +11/16 | 0101 | 01011000 00000000 |
| +13/16 | 0110 | 01101000 00000000 |
| +15/16 | 0111 | 01111000 00000000 |

This table shows that the OS4 bits are stored in the four high bits with a constant value of 1 in the 11th bit position. Thus, to convert from OS4 to 16-bit, simply populate the high four bits with the OS4 representation, and set the 11th bit to 1.

Converting from 16-bit to OS4 can be performed by taking the four high bits and ignoring the remaining twelve bits. In this mapping, the following ranges of 16-bit values map to the 16 possible OS4 values:

| | | | | |
|---|---|---|---|---|
| -1.00000000000000 | to | -0.87503051757813 | -> | -0.93750000000000 |
| -0.87500000000000 | to | -0.75003051757813 | -> | -0.81250000000000 |
| -0.75000000000000 | to | -0.62503051757813 | -> | -0.68750000000000 |
| -0.62500000000000 | to | -0.50003051757813 | -> | -0.56250000000000 |
| -0.50000000000000 | to | -0.37503051757813 | -> | -0.43750000000000 |
| -0.37500000000000 | to | -0.25003051757813 | -> | -0.31250000000000 |
| -0.25000000000000 | to | -0.12503051757813 | -> | -0.18750000000000 |
| -0.12500000000000 | to | -0.00003051757813 | -> | -0.06250000000000 |
| 0 | to | 0.12496948242188 | -> | 0.06250000000000 |
| 0.12500000000000 | to | 0.24996948242188 | -> | 0.18750000000000 |
| 0.25000000000000 | to | 0.37496948242188 | -> | 0.31250000000000 |
| 0.37500000000000 | to | 0.49996948242188 | -> | 0.43750000000000 |
| 0.50000000000000 | to | 0.62496948242188 | -> | 0.56250000000000 |
| 0.62500000000000 | to | 0.74996948242188 | -> | 0.68750000000000 |
| 0.75000000000000 | to | 0.87496948242188 | -> | 0.81250000000000 |
| 0.87500000000000 | to | 0.99996948242188 | -> | 0.93750000000000 |

The SNR loss introduced by quantization depends upon the standard deviation of the noise and the level of the received satellite signal. With 2-bit quantization, the noise should be scaled so that it has a standard deviation of ½. With 4-bit quantization, it should be scaled to have a standard deviation of ¼.

The downsampler filter coefficients can be arbitrarily scaled to produce an output at a desired level. However, scaling the coefficients to yield an output with standard deviation ½ is undesirable because this will result in frequent clipping internally to the downsampler structure. Instead, the coefficients can be scaled so that the output has a standard deviation of 1/32. Prior to quantizing to 2-bits, you must scale the signal, with saturation, by a factor of 16. Prior to quantizing to 4-bits, you must scale the signal, with saturation, by a factor of 8. This provides the desired scaling.

Let $h[k]$, $k=0, 1, \ldots, N-1$ represent the coefficients of the complex bandpass filter. Let $\sigma_{in}$ and $\sigma_{out}$ represent the standard deviations of the input and output of the filter respectively. These are related to the filter coefficients by the expression:

$$\frac{\sigma_{out}^2}{\sigma_{in}^2} = \sum_{k=0}^{N-1} h^2[k]$$

The input to the bandpass filter receives the 2-bit data directly from the A/D, and this has $\sigma_{in}=0.47$. In order to achieve $\sigma_{out}=1/32$, this requires that $$\sum_{k=0}^{N-1} h^2[k] = \frac{\sigma_{out}^2}{\sigma_{in}^2} = \frac{(1/32)^2}{(0.47)^2} = 4.4208 \times 10^{-3}$$

Thus, the filter should be scaled such that the above relationship holds true.

The above description of illustrated embodiments of the signal processing system is not intended to be exhaustive or to limit the system to the precise form disclosed. The teachings of the signal processing provided herein can be applied to other processing systems and communication systems, not only for the systems described above. While specific embodiments of, and examples for, the signal processing are described herein for illustrative purposes, various equivalent modifications are possible within the scope of the system, as those skilled in the relevant art will recognize.

For example, there are other possible optimizations which could be applied. In one embodiment, the length of the polyphase components is reduced to two samples by reducing the overall filter length to 32 samples. It is expected that this may cause a loss of -0.3 dB.

In another embodiment, an 8-bit packed representation is used for the data in the lookup tables. Thus, 32-bits could be used to store two complex values. To implement this, the data stored in the table should be offset. Five bits are used to represent numbers in the range -16 to 15. Then an offset of 16 is added to this. Values will then be in the range 0 to 31. 32-bit additions would then accomplish the addition of two complex words.

Aspects of the signal processing described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs).

Some other possibilities for implementing aspects of the signal processing include: microcontrollers with memory (such as electronically erasable programmable read only memory (EEPROM)), embedded microprocessors, firmware, software, etc. Furthermore, aspects of the signal processing may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. When the word "or" is used in reference to a list of two or more items, that word covers all of the following interpretations of the word: any of the items in the list, all of the items in the list and any combination of the items in the list.

The elements and acts of the various embodiments described above can be combined to provide further embodiments. These and other changes can be made to the signal processing in light of the above detailed description.

We claim:

1. A device for processing a signal, comprising:
   a memory for storing one or more lookup tables, each lookup table comprising a plurality of entries, each entry comprising an input segment and an output segment, wherein the output segment is a system response to the corresponding input segment; and
   a processor configured to receive an input data sequence comprising one or more input segments, and for each of the input segments, retrieve from one of the lookup tables the output segments corresponding to the input segment, wherein the processor is further configured to perform a time-shifted sum of one or more output segments to produce an output sequence that is a downsampled representation of the input data sequence.

2. The device of claim 1, wherein:
   the processor is further configured to resample the input data sequence by inserting or deleting one or more samples to or from the input data sequence.

3. The device of claim 2, wherein:
   the input data sequence comprises a plurality of sub-blocks; and
   the processor is configured to resample the input data sequence by duplicating one sample into each sub-block.

4. The device of claim 1, wherein:
   each input segment comprises a plurality of input samples.

5. The device of claim 4, wherein:
   each input sample is a 2-bit sample comprising a sign bit and a magnitude bit.

6. The device of claim 4, wherein:
   each input sample is a 2-bit sample represented by two-bit offset data format.

7. The device of claim 4, wherein:
   each input sample is a 1-bit sample comprising a sign bit.

8. The device of claim 1, further comprising:
   a polyphase FIR filter producing a plurality of phases, each phase corresponding to an output segment, wherein one of the phases corresponds to an output segment comprising fewer non-zero values than the other output segments, wherein the one or more lookup tables are constructed using the one of the phases corresponding to the output segment comprising fewer non-zero values.

9. The device of claim 1, wherein:
   wherein each input segment comprises a plurality of D input samples where D is the Sampling Rate Compression Ratio, and each input segment comprises a plurality of input subsegments; and
   each of the lookup tables corresponds to one of the input subsegments.

10. The device of claim 9, wherein:
    each of the input segments comprise sixteen 2-bit data samples;
    each input segment is further divided into four 8-bit input subsegments; and
    the one or more lookup tables comprises four lookup tables, each of the four lookup tables corresponding to one of the four input subsegments.

11. The device of claim 1, wherein:
    each input segment comprises a plurality of input samples; and
    each input segment comprises a plurality of input subsegments, each lookup table corresponding one of the input subsegments, wherein each input subsegment comprises sign bits or magnitude bits, but not both.

12. The device of claim 1, wherein:
    each input segment comprises a plurality of input samples; and each input segment comprises a plurality of input subsegments, each lookup table corresponding one of the input subsegments, wherein each input subsegment comprises even-numbered samples or odd-numbered samples, but not both.

13. The device of claim 1, wherein:
    each input segment comprises a plurality of input samples, each input sample comprising a 2-bit offset data format; and
    the processor is further configured to:
    for each input sample:
      retrieve from one of the lookup tables the output segment corresponding to the Most Significant Bit of the input sample; and
      retrieve from the same lookup table the output segment corresponding to the Least Significant Bit of the input sample; and
    prior to summing the output segments to produce the output sequence, scale the output segments.

14. The device of claim 13, wherein:
    the input data sequence is converted from sign/magnitude data format to 2-bit offset data format.

15. The device of claim 13, wherein:
    the input data sequence is initially received as 2-bit offset data format.

16. The device of claim 1, wherein:
    the output segments in the lookup tables correspond to a modulation and a decimation of the input data sequence.

17. The device of claim 1, wherein:
    for each input data sequence the processor is configured to modulate the input data sequence by an intermediate frequency prior to retrieving the output segment corresponding to the input segment.

18. The device of claim 17, wherein:
the processor is configured to insert or delete samples from the modulated input data sequence to produce an output sample rate comprising a power of two samples per millisecond.

19. The device of claim 1, wherein:
the signal comprises a global positioning system ("GPS") signal.

20. The device of claim 1, further comprising:
a Finite Impulse Response ("FIR") filter for generating data for entries to be stored in the one or more lookup tables.

21. A method of processing a signal, comprising:
storing one or more lookup tables, each lookup table comprising a plurality of entries, each entry comprising an input segment and an output segment, wherein the output segment is a system response to the corresponding input segment;
receiving an input data sequence comprising one or more input segments;
for each of the input segments, retrieving from one of the lookup tables the output segments corresponding to the input segment; and
summing one or more time-shifted output segments to produce an output sequence that is a downsampled representation of the input data sequence.

22. The method of claim 21, further comprising:
resampling the input data sequence by inserting or deleting one or more samples to or from the input data sequence.

23. The method of claim 22, wherein:
the input data sequence comprises a plurality of sub-blocks; and
said resampling the input data sequence comprises duplicating one sample into each sub-block.

24. The method of claim 21, wherein:
each input segment comprises a plurality of input samples.

25. The method of claim 24, wherein:
each input sample is a 2-bit sample comprising a sign bit and a magnitude bit.

26. The method of claim 24, wherein:
each input sample is a 2-bit sample represented by two-bit offset data format.

27. The method of claim 24, wherein:
each input sample is a 1-bit sample comprising a sign bit.

28. The method of claim 21, wherein:
said storing the one or more lookup tables comprises using a polyphase FIR filter to generate the lookup tables, wherein the polyphase FIR filter produces a plurality of phases, each phase corresponding to an output segment, wherein one of the phases corresponds to an output segment comprising fewer non-zero values than the other output segments, wherein the lookup tables are generated using the one of the phases corresponding to the output segment comprising fewer non-zero values.

29. The method of claim 21, wherein:
wherein each input segment comprises a plurality of D input samples where D is the Sampling Rate Compression Ratio, and each input segment comprises a plurality of input subsegments; and
each of the lookup tables corresponds to one of the input subsegments.

30. The method of claim 29, wherein:
each of the input segments comprise sixteen 2-bit data samples;
each input segment is further divided into four 8-bit input subsegments; and
the one or more lookup tables comprises four lookup tables, each of the four lookup tables corresponding to one of the four input subsegments.

31. The method of claim 21, wherein:
each input segment comprises a plurality of input samples; and
each input segment comprises a plurality of input subsegments, each lookup table corresponding one of the input subsegments, wherein each input subsegment comprises sign bits or magnitude bits, but not both.

32. The method of claim 21, wherein:
each input segment comprises a plurality of input samples; and
each input segment comprises a plurality of input subsegments, each lookup table corresponding one of the input subsegments, wherein each input subsegment comprises even-numbered samples or odd-numbered samples, but not both.

33. The method of claim 21, wherein:
each input segment comprises a plurality of input samples, each input sample comprising a 2-bit offset data format; and
said retrieving from one of the lookup tables the output segments corresponding to the input segment comprises:
for each input sample:
retrieving from one of the lookup tables the output segment corresponding to the Most Significant Bit of the input sample; and
retrieving from the same lookup table the output segment corresponding to the Least Significant Bit of the input sample; and
further comprising scaling the output segments prior to summing the output segments.

34. The method of claim 33, wherein:
the input data sequence is converted from sign/magnitude data format to 2-bit offset data format.

35. The method of claim 33, wherein:
the input data sequence is initially received as 2-bit offset data format.

36. The method of claim 21, wherein:
the output segments in the lookup tables correspond to a modulation and a decimation of the input data sequence.

37. The method of claim 21, further comprising:
for each input data sequence, modulating the input data sequence by an intermediate frequency prior to retrieving the output segment corresponding to the input segment.

38. The method of claim 37, further comprising:
inserting or deleting samples from the modulated input data sequence to produce an output sample rate comprising a power of two samples per millisecond.

39. The method of claim 21, wherein:
the signal comprises a global positioning system ("GPS") signal.

40. The method of claim 21, further comprising:
using a Finite Impulse Response ("FIR") filter to generate data for entries to be stored in the one or more lookup tables.

41. The device of claim 1, wherein:
the memory stores a plurality of lookup tables.

42. The method of claim 21, wherein:
said storing one or more lookup tables comprises storing a plurality of lookup tables.

* * * * *